United States Patent
Wiltafsky-Martin et al.

(10) Patent No.: US 12,525,333 B2
(45) Date of Patent: Jan. 13, 2026

(54) METHOD FOR THE DETERMINATION OF PROCESSING INFLUENCES ON THE ENERGY VALUE OF FEEDSTUFF RAW MATERIALS AND/OR FEEDSTUFFS

(71) Applicant: Evonik Operations GmbH, Essen (DE)

(72) Inventors: Markus Wiltafsky-Martin, Moembris (DE); Johann Fickler, Moemlingen (DE)

(73) Assignee: Evonik Operations GmbH, Essen (DE)

( * ) Notice: Subject to any disclaimer, the term of this patent is extended or adjusted under 35 U.S.C. 154(b) by 1065 days.

(21) Appl. No.: 17/049,101

(22) PCT Filed: May 8, 2019

(86) PCT No.: PCT/EP2019/061767
§ 371 (c)(1),
(2) Date: Oct. 20, 2020

(87) PCT Pub. No.: WO2019/215206
PCT Pub. Date: Nov. 14, 2019

(65) Prior Publication Data
US 2021/0241880 A1 Aug. 5, 2021

(30) Foreign Application Priority Data
May 9, 2018 (EP) .................... 18171512

(51) Int. Cl.
| | | |
|---|---|---|
| *G01N 33/48* | (2006.01) | |
| *A23K 10/30* | (2016.01) | |
| *A23K 50/30* | (2016.01) | |
| *A23K 50/75* | (2016.01) | |
| *G16H 20/60* | (2018.01) | |

(52) U.S. Cl.
CPC ............. *G16H 20/60* (2018.01); *A23K 10/30* (2016.05); *A23K 50/30* (2016.05); *A23K 50/75* (2016.05)

(58) Field of Classification Search
None
See application file for complete search history.

(56) References Cited

U.S. PATENT DOCUMENTS

2015/0169847 A1 6/2015 McKinney et al.

FOREIGN PATENT DOCUMENTS

| CN | 110546499 A | 12/2019 |
| WO | WO 97/02489 A1 | 1/1997 |

OTHER PUBLICATIONS

Le Bellego, L., and Jean Noblet. "Performance and utilization of dietary energy and amino acids in piglets fed low protein diets." Livestock Production Science 76.1-2 (2002): 45-58.*
Kong, C., and O. Adeola. "Evaluation of amino acid and energy utilization in feedstuff for swine and poultry diets." Asian-Australasian Journal of Animal Sciences 27.7 (2014): 917.*
Valdes, E. V., and S. Leeson. "Measurement of metabolizable energy, gross energy, and moisture in feed grade fats by near infrared reflectance spectroscopy." Poultry Science 73.1 (1994): 163-171.*
International Search Report and Written Opinion issued on Aug. 19, 2019 in PCT/EP2019/061767 filed on May 8, 2019.
Rojas et al., "Processing of ingredients and diets and effects on nutritional value for pigs", Journal of Animal Science and Biotechnology, 2017, vol. 8, No. 1, pp. 1-13, XP021245691.
Sun et al., "Nutritional assessment and effects of heat processing on digestibility of Chinese sweet potato protein", Journal of Food Composition and Analysis, 2012, vol. 26, No. 1, pp. 104-110, XP028522119.
U.S. Appl. No. 16/485,054, filed Aug. 9, 2019, 2019-0360986, Wiltafsky-Martin, et al.

* cited by examiner

*Primary Examiner* — Anna Skibinsky
(74) *Attorney, Agent, or Firm* — Oblon, McClelland, Maier & Neustadt, L.L.P.

(57) ABSTRACT

A computer-implemented methods for the determination and/or assessment of processing influences on the energy value of a feedstuff raw material and/or feedstuff, in which the processing conditions indicator of the feedstuff raw material and/or feedstuff is determined and the corrected energy values of the feedstuff raw material and/or feedstuff is determined. A process for the preparation of a feed considering the determined processing influences and the energy values of feedstuff raw materials and/or feedstuffs.

3 Claims, 4 Drawing Sheets

Figure 1:
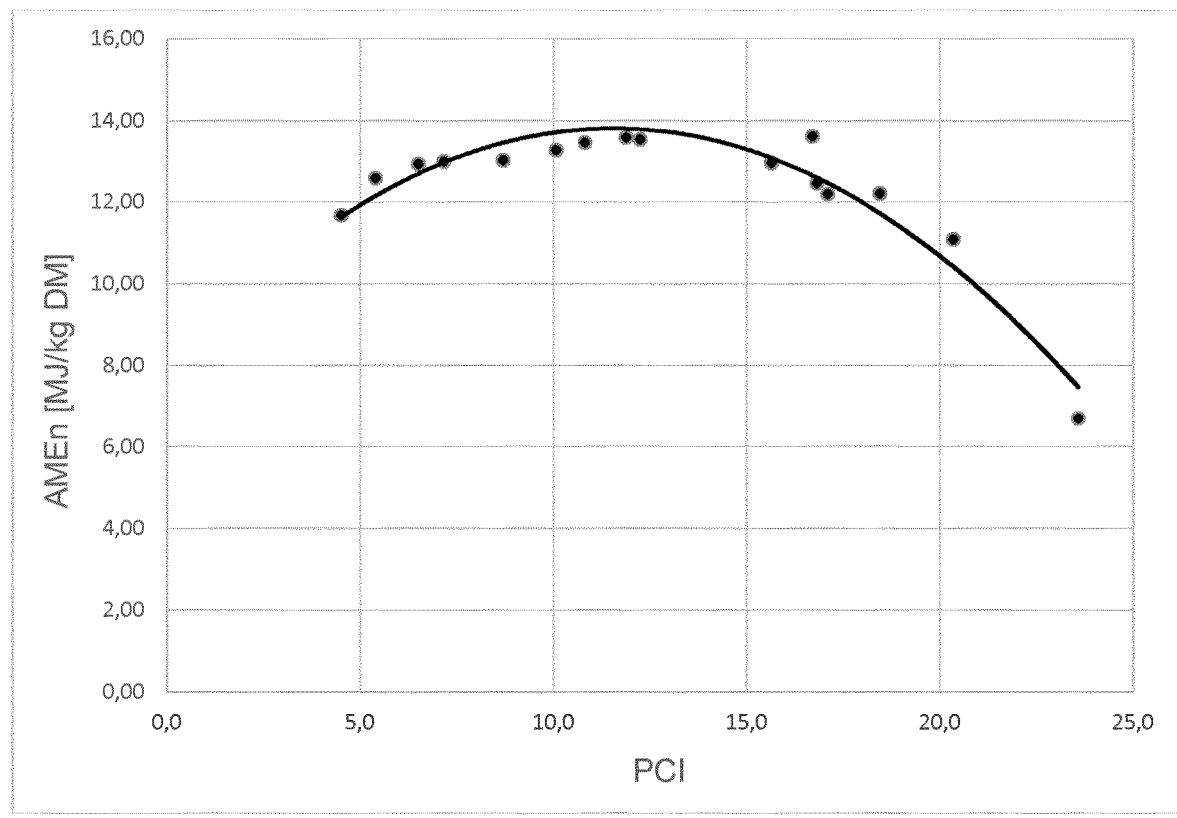

METHOD FOR THE DETERMINATION OF PROCESSING INFLUENCES ON THE ENERGY VALUE OF FEEDSTUFF RAW MATERIALS AND/OR FEEDSTUFFS

The present invention relates to a method for the determination of processing influences on the energy value of feedstuff raw materials and/or feedstuffs, a process for the optimization of the energy value of feedstuff raw materials and/or feedstuffs considering the determined processing influences and the thus obtained and/or obtainable feedstuffs.

Animals use feed/diets not only for the production of proteins and the production of meat but also for energy production. Energy is released when the organic molecules such as proteins, fat, carbohydrates, e.g. starch, fibers, and sugar, in the feed/diets undergo oxidation. Feed is the largest single cost factor in animal production. For example, feed makes up for about 60% of the costs in the production of pig. At least 50% of the feed costs can be attributed to the supply of energy to the animals, thus making energy the largest portion of the cost. It is therefore important to estimate the energy values of feeds as accurately as possible, for least-cost formulations as well as in supplying animals with the required amount of energy.

However, feedstuff raw materials and/or feedstuffs and in particular plant based feedstuffs, cannot be used in their actual form of appearance in animal nutrition. Due to a lot of reasons feedstuffs can have negative influences on animals and the respective animal products like meat and milk and in the worst case also on humans as their consumers. Examples for this are a wrong selection of the feedstuffs and the ration selection and the thus resulting nutrition and energy supply, a contamination of feedstuffs, a bioburden and/or toxin burden (mycotoxin) in spoiled feed and the so-called anti-nutritional factors in plant based feedstuffs.

Anti-nutritional factors result from the secondary metabolism of plants and are present only in particular plant species. They perform no essential functions in the primary metabolism. Rather, their function is the defense of varmints and pests, the regulation and function as dying stuffs and fragrances. The negative effects of anti-nutritional factors on the animal consist in the feed-uptake, a reduced animal performance, a change in digestibility of the nutrients, metabolic disorders and their toxicity.

Anti-nutritional factors can be grouped into the substance groups of carbohydrates, proteins, phenols and phenol derivatives, glucosides and glycosides, chelators and glucosinolates as well as goitrogens, whereby singular compounds can be grouped into more than one substance class.

Examples of anti-nutritional factors from the substance group of carbohydrates are non-starch-polysaccharides, and indigestible oligosaccharides.

Examples of anti-nutritional factors from the substance group of proteins are proteinase inhibitors and the lectins.

Examples of anti-nutritional factors from the substance group of phenols and phenol derivatives are tannins, alkyl resorcinols, and gossypol.

Examples of anti-nutritional factors from the substance group of glucosides and glycosides are pyrimidine-glucosides, alpha-galactosides, cyanogenic glucosides, and saponins.

Examples of anti-nutritional factors from the substance group of alkaloids are spartein, lupinin, hydroxylupanin, angustifolin, solanin, and sinapin.

Examples of anti-nutritional factors from the substance group of chelators are phytic acid, and gossypol.

Examples of anti-nutritional factors from the substance groups of glucosinolates are glucobrassicin, gluconapin, glucobrassiconapin and progoitrin.

Also the goitrogens (found in soy, cassava, vegetables in the genus *Brassica*, such as broccoli and cabbage, and other cruciferous vegetables) lead to an enlargement of the thyroid gland (=struma).

The above non-limiting list of anti-nutritional factors and their negative effects on the animals illustrate that anti-nutritional factors have a big impact on the feeding praxis. Thus, in order to avoid the negative effects of anti-nutritional factors on the animal, anti-nutritional factors should be removed from the raw materials used for preparing feedstuffs or detoxified/inactivated. In case it is not possible to completely remove or detoxify the anti-nutritional factors from the feedstuff raw materials, the supply of anti-nutritional factors to the animals must be limited, in order to avoid detrimental effects on the animals.

For the removal or detoxification of anti-nutritional factors from the feedstuff raw materials or the reduction of their presence in feedstuff raw materials, the raw materials used for preparing feedstuffs are subject to a heat treatment such as cooking or toasting. This leads to a deactivation of amongst others proteinase inhibitors and lectins, or a treatment with alkali, which for example leads to a removal of sinapin. Therefore, many feedstuff raw materials are subjected to a heat treatment. In addition, feed products are also subjected to a heat treatment in order to remove moisture. For example, the article "Feed extrusion process description" by Galen J. Rokey et al. (Revista Brasileira de Zootecnia, vol. 39, pp. 510-518, 2010) discloses that extrusion cooking for the production of many products has come of ages within the past three decades and provides a very useful and economical tool for processing animal diets. This process permits better utilization of available cereal grains and vegetable and animal proteins to permit cost effective and nutritionally sound diets with improved and unique feeding characteristics. The articles further discloses that palatable, functional, and tailor-made feedstuffs can be profitably manufactured of raw material formulation, system configuration, and processing conditions.

However, such a heat-treatment can lead to a damage of the nutritional value of the feedstuff raw materials. For example, compounds with an amino group such as amino acids and proteins, are subjected to the Maillard reaction in the presence of reducing compounds, in particular of reducing sugars. This is in particular the case for lysine with an s-amino group, which can react with a multitude of ingredients in feedstuff raw materials. The compounds resulting from these reactions can be partly absorbed in the intestine of the animal, but they do not have any nutritional value. For example, the free s-amino group of lysine molecules or lysine containing proteins can react with the carbonyl group of reducing sugars, in particular of hexoses like glucose, in a reversible condensation reaction which initially gives a Schiff's base which subsequently is reacted in an irreversible Amadori rearrangement under formation of ε-N-desoxyketosyl lysine which is sometimes referred to as Amadori product or early Maillard product. The ε-N-desoxyketosyl lysine can further react under formation of brown pigments or melanoidines, which are yellow-brownish to almost black colored, nitrogen containing organic compounds. The Schiff's bases, at least those formed of aliphatic aldehydes and reducing sugars, can be absorbed almost completely in the intestine of mammals. By comparison, the metabolism of the Amadori product ε-N-desoxyketosyl is negligible. The conditions employed in the processing of feedstuff raw materials, in particular high temperatures in cooking or toasting, extreme pH values and high reactant concentrations, favor the Maillard reaction. However, a part of the reacted lysine derivatives are acid labile and can revert back to lysine during the acid hydrolysis step of the conventional wet chemical amino acid analysis. This does not, however, occur in the digestive tract. Consequently, the amino acid concentrations in the feedstuffs, determined by conventional amino acid analysis, will be misleading and will overestimate the real amino acid content and availability in the heat-damaged feedstuffs.

The Maillard reaction is considered the main reason for the degradation of amino acids and amino acid containing proteins in feedstuff raw materials, in particular of lysine or lysine containing proteins. However, apart from the Maillard reaction there are further reactions, which lead to the degradation of amino acids and amino acid containing proteins. For example, the strong heating of proteins in the absence of fats or (reducing) sugars leads to the reaction of lysine molecules with the amino side chains of amino acids such as asparagine and glutamine under formation of internal peptide bonds, so-called isopeptides. Besides the reactions giving isopeptides other reactions also occur, such as the formation of lysino-alanine, the reaction of lysine molecules with oxidized polyphenols, the acylation of amino acids and the racemization of amino acids. In addition to the modification of lysine molecules, the processing of feedstuff raw materials also leads to the denaturation of proteins and the formation of extensive protein cross-linking, intra—as well as intermolecular, and also with other amino acids than lysine. The aforementioned reactions including the Maillard reaction can lead to a general loss of amino acids and reduction of the digestibility of the amino acids and proteins in the feedstuff raw materials and thus to a reduction of the uptake of amino acids, in particular lysine, and proteins.

Heat exposure is also of significant influence on the amino acid content of other feedstuffs, which are obtained from processes with high heat exposure, such as the so-called DDGS (dried distiller's grains with solubles). Typically, DDGS is obtained in plants for the preparation of bioethanol on the basis of starch containing cereals such as corn, wheat, barley and sorghum after distillation of the ethanol and drying of the remaining by-product stillage. The proteins, fibers and oils contained in the stillage are nutrients, which define its use as feedstuff. However, only the dried by-product is storable and can be also fed to other species than ruminants. Typically, the dried by-product is pelletized after drying and the thus obtained feedstuff is typically referred to as DDGS. About a third of the cereals used for bioethanol production result in DDGS. Each bushel of the cereals used in the bioethanol production (one U.S. bushel of cereals equals 35.2391 liters) gives about 2.7 gallons of ethanol (1 gallone equals 4.54609 liters), 18 pound of DDGS (1 pound equals 453.59237 g) and 18 pound of carbon dioxide. DDGS has a high content of residuals of cereal and residuals of yeast proteins, minerals and vitamins and thus, a high residual energy value. Due to its high protein content of about 30% and its additional energy value DDGS is a source of proteins and energy which can be easily digested by beef cattle and milking cows. Further, DDGS can be used for the feeding of poultry and pigs. The use of DDGS for feeding ruminants is particularly common and well documented in the USA. In North America about 80% of the DDGS volume is used for feeding cattle. However, the heat exposure in the distillation of the ethanol formed during the fermentation and in the drying of the remaining by-product leads to a strong heat stress on the amino acids in the by-product, which can lead to the Maillard reaction of amino acids and proteins, the formation of isopeptides and lysino-alanines, the reaction of amino acids with oxidized polyphenols, the acylation of amino acids, the racemization of amino acids, the denaturation of proteins and the formation of extensive protein cross linking.

Beyond that, processing also has an influence on the energy value of a feedstuff raw material and/or feedstuff, in particular digestible energy, metabolisable energy and net energy. For example, protein digestibility of under-processed soy products is reduced because of an inadequate, i.e. insufficient, reduction of anti-nutritive factors, which also becomes apparent in a reduced energy value. By comparison, in the case of an over-processing there is the formation of Maillard products, which are unusable for the metabolism of animals and also inhibit the action of starch degrading enzymes. This also reduces the energy value of feedstuff raw materials and/or feedstuffs. Thus, only adequately processed, i.e. optimally processed, feedstuff raw materials and/or feedstuffs demonstrate optimal nutritive characteristics.

A multitude of parameters for the characterization of processing influences on feedstuff raw materials is known, but experiments have shown that none of the literature-known parameters is suitable for the adequate characterization of food-relevant processing influences on foodstuff raw materials. Amongst others this is due to the fact that the individual parameters lead to different statements. For example, the determination of the urease activity is the most common test to evaluate the quality of soybean processing. However, this test only allows to detect an under-processing of the feedstuff raw material but it is not suitable for detecting an over-processing of feedstuff raw materials, By comparison, the solubility of proteins of a sample in alkali in principle allows to distinguish over-processed products from adequately processed products. However, this distinction requires to make assumptions for the degree of heat damage at specific values for the solubility of proteins in alkali. Hence, the assumptions already have a big influence on the categorization of a feedstuff raw material and/or feedstuff. Furthermore, this method alone also leads to contradictory statements regarding the quality of a feedstuff raw material and/or feedstuff.

It is therefore not surprising that neither individual known parameters nor a specific combination of parameters has been yet accepted in the feedstuff industry as sufficient or even as mandatory for the characterization of food-relevant features.

The characteristics described above apply to almost all processed feedstuff raw materials and/or feedstuffs to varying degrees, i.e. oilseeds (soy extraction meal and expeller, full-fat soybeans, rapeseed meal and expeller, cotton extraction meal, peanut extraction meal, sunflower extraction meal, coconut extraction meal, palm kernel extraction meal, etc.), processed further feedstuff raw materials, e.g. legumes (toasted guar flour), brewery and distillation by-products, provided that they were subjected to a drying process, for example.

Thus, there was a need for a method which permits the characterization of processing influences on the energy value of feedstuff raw materials on a global scale and independently from the specific significance and in particular, the strengths and weaknesses of the individual methods.

According to the present invention this problem is solved by obtaining a set of parameters which are complementary in their significance and thus are combinable. These parameters are amongst others the trypsin inhibitor activity, the urease activity, the protein solubility in alkali, the protein dispersibility index, and/or the ratio of the reactive amount of lysine to the total amount of lysine. A further parameter is at least one amino acid selected from the group consisting of methionine, cysteine, cystine, threonine, leucine, arginine, isoleucine, valine, histidine, phenylalanine, tyrosine, tryptophan, glycine, serine, proline, alanine, aspartic acid and glutamic acid. These parameters are obtained by measuring them in a sample series of a feedstuff raw material from different time points of processing of the specific feedstuff raw material. For each of the measured parameters the so-called processing conditions indicator (PCI) is determined, which describes all conceivable processing conditions of a feedstuff raw material, i.e. under-, adequate or over-processing. Next, from the same type of sample as for the PCI, the gross energy (GE), the digestible energy (DE), the metabolisable energy (ME) and net energy (NE), usually determined for pigs; and/or the apparent metabolisabe energy (AME), usually determined for poultry, is/are determined. The thus obtained values are then expressed as a function of the processing conditions indicator in the form of an equation and/or plotted as a graph.

An object of the present invention is therefore a computer-implemented method for the determination of processing influences on the energy value of a feedstuff raw material and/or feedstuff, comprising the steps of
  a) subjecting a sample of a processed feedstuff raw material and/or feedstuff to
    a1) measuring at least one parameter selected from the group consisting of trypsin inhibitor activity, urease activity, protein solubility in alkali and protein dispersibility index of the sample;
    a2) determining the ratio of the reactive amount of lysine to the total amount of lysine comprising measuring the reactive amount of lysine and the total amount of lysine in the sample, followed by the formation of the ratio of the reactive amount of lysine to the total amount of lysine; and
    a3) measuring the amount of at least one amino acid selected from the group consisting of methionine, cysteine, cystine, threonine, leucine, arginine, isoleucine, valine, histidine, phenylalanine, tyrosine, tryptophan, glycine, serine, proline, alanine, aspartic acid and glutamic acid in the sample;
  b) plotting the parameters obtained in steps a1) to a3) as a function of the time points of processing of the sample in step a);
  c1) determining the area in the plot of step b), where the value of the trypsin inhibitor activity, expressed as mg of trypsin per g sample, is more than 4, the increase in the pH value in the determination of the urease activity is more than 0.35, the value of the protein solubility in alkali, expressed as the percentage of protein in the sample that is soluble in an alkaline solution, is more than 85%, and/or the value of the protein dispersibility index, expressed as the percentage of the original nitrogen content of the sample, is more than 40%, and assigning the thus obtained area as under-processed;
  c2) determining the area in the plot of step b), where the value of the ratio of the reactive amount of lysine to the total amount of lysine is less than 90%, the value of the protein dispersibility index, expressed as the percentage of the original nitrogen content of the sample, is less than 15%, and/or the value of the protein solubility in alkali, expressed as the percentage of protein in the sample that is soluble in an alkaline solution, is less than 73%, and assigning the thus obtained area as over-processed;
  c3) determining the area in the plot of step b), where the value of the trypsin inhibitor activity, expressed as mg of trypsin per g sample, is less than 4, the value of the protein solubility in alkali, expressed as the percentage of protein in the sample that is soluble in an alkaline solution, is between 73 and 85%, the value of the protein dispersibility index, expressed as the percentage of the original nitrogen content of the sample, is between 15 and 40% and/or the value of the ratio of the reactive amount of lysine to the total amount of lysine is at least 90%, and assigning the thus obtained area as adequately processed;
  and/or subtracting the areas determined in steps c1) and c2) from the plot of b) and assigning the thus obtained area as adequately processed;
  d) generating a processing scale by standardizing the areas obtained in steps c1) to c3) to equal size, sorting them from over-processing to under-processing or vice versa and assigning a continuous scaling to the standardized and sorted areas;
  e) inserting the values of the parameters obtained in steps a1) to a3) into a power series, and forming the mean of the values obtained from each power series, wherein said mean is designated as the processing condition indicator (PCI); and
  f) measuring the gross energy (GE), the digestible energy (DE), the metabolizable energy (ME), the net energy (NE) for pigs, and/or the apparent metabolizable energy corrected to zero nitrogen retention (AMEn) for poultry in a sample of the same feedstuff raw material and/or feedstuff as in step a).

Preferably, the amount of all amino acids mentioned in step a3) are measured.

In the context of the present invention the term processed feedstuff raw material and/or feedstuff is used to denote a feedstuff material and/or feedstuff, which was subjected to a treatment in order to deactivate or to remove anti-nutritional factors in the feedstuff raw material and/or feedstuff. Said treatment can be a heat treatment, such as cooking or toasting, for the deactivation of proteinase inhibitors and lectins, amongst others, or a treatment with alkali for the removal of sinapin, for example.

In the context of the present invention the term the reactive amount of lysine is used to denote the amount of lysine, which is actually available for the animal, in particular for the digestion in the animal. By comparison, the term the total amount of lysine is used in the context of the present invention to the sum of the amount of lysine, which is actually available for the animal, in particular for the digestion in the animal, and of the amount of lysine, which is not available for the animal, in particular not for the digestion in the animal. The latter amount of lysine is typically due to degradation reactions of lysine, such as the already mentioned Maillard reaction.

In the context of the present invention a processing, which leads to damages on feedstuff raw materials and/or feedstuffs and in particular to decreased amounts of amino acids, is referred to as over-processing. By comparison, a processing, which does not give a complete or at least acceptable removal of anti-nutritional factors from feedstuff raw materials and/or feedstuff, is referred to as under-processing. Finally, a processing, which leads to a complete or at least acceptable destruction of anti-nutritional factors without a destruction of amino acids and/or proteins, is referred to as adequately-processing or adequate processing.

The measuring of the trypsin inhibitor activity is based on the ability of the inhibitors to form a complex with the enzyme trypsin and thus reduce its activity. Trypsin catalyzes the hydrolysis of the synthetic substrates N-alpha-benzoyl-D,L-arginine-p-nitroanilide (DL-BAPNA, IUPAC name N-[5-(diaminomethylideneamino)-1-(4-nitroanilino)-1-oxopentan-2-yl]benzylamide) and N-alpha-benzoyl-L-arginine-p-nitroanilide (L-BAPNA, name N-[5-(diaminomethylideneamino)-1-(4-IUPAC nitroanilino)-1-oxopentan-2-yl]benzylamide). This catalyzed hydrolysis releases the yellow-colored product p-nitroaniline free and thus, leads to a change in absorbance. The trypsin activity is proportional to the yellow color. The concentration of the p-nitroaniline can be determined by means of spectroscopy at a wavelength of 410 nm. L-BAPNA is typically used in the method ISO 14902 (2001) und DL-BAPNA is typically used in the method AACC 22.40-01 (a modification of method originally invented by Hamerstrand in 1981).

In the method ISO 14902 (2001) the sample is first finely ground with a 0.50 mm sieve. During the grinding any evolution of heat should be avoided. The ground sample is mixed with aqueous alkaline solution, e.g. 1 g of sample in 50 ml of sodium hydroxide solution (0.01 N), and the thus obtained solution, suspension, dispersion or emulsion is then stored for a period of up to ca. 24 hours at a temperature of 4° C. at the most. The thus obtained mixture has a pH of from 9 to 10, especially of from 9.4 to 9.6. The resulting solution is diluted with water and left standing. A sample of this solution, e.g. 1 ml, is taken and diluted as indicated by its presumed or previously approximated trypsin inhibitor activity content so that 1 ml of diluted solution would cause a 40 to 60% inhibition of the enzymatic reaction. Trypsin working solution, e.g. 1 ml, is added to a mixture of L-BAPNA, water and the diluted sample extract solution, e.g. 5 ml of L-BAPNA, 2 ml of (distilled) water and 1 ml of the appropriately diluted sample extract solution. The samples are then incubated for exactly 10 minutes at 37° C. The reaction is stopped by addition of 1 ml of acetic acid (30%). A blank sample is prepared as above, but the trypsin is added after the acetic acid. After centrifugation at 2.5 g, the absorbance is measured at a wavelength of 410 nm.

In the method AACC 22-40.01 the sample is first finely ground with a 0.15 mm sieve. During the grinding any evolution of heat should be avoided. The ground sample is mixed with aqueous alkaline solution, e.g. 1 g of sample in 50 ml of sodium hydroxide solution (0.01 N), and slowly stirred for 3 hours at 20° C. The pH of the thus obtained solution, suspension, dispersion or emulsion should be between 8 and 11, preferably between 8.4 and 10. The resulting solution, suspension, dispersion or emulsion is diluted with water, shaken and left standing. A sample of this solution, e.g. 1 ml, is taken and diluted as indicated by its presumed or previously approximated trypsin inhibitor activity content so that 1 ml of diluted solution would cause a 40 to 60% inhibition of the enzymatic reaction. Trypsin working solution, e.g. 2 ml, is added to a mixture of D,L-BAPNA, water and the diluted sample extract solution, e.g. 5 ml of D,L-BAPNA, 1 ml of (distilled) water and 1 ml of the appropriately diluted sample extract solution. The samples are then incubated for exactly 10 minutes at 37° C. The reaction is stopped by addition of 1 ml of acetic acid (30%). A blank sample is prepared as above, but the trypsin is added after the acetic acid. After centrifugation at 2.5 g, the absorbance is measured at a wavelength of 410 nm.

Independently from the method used, the trypsin inhibitor activity is calculated as mg trypsin inhibitor per g trypsin, with the following formula:

$$i = \frac{(Ar - Abr) - (As - Abs)}{(Ar - Abr)}$$

i=inhibition percentage (%);
Ar=absorbance of the solution with standard;
Abr=absorbance of the blank with standard;
As=absorbance of the solution with sample;
Abs=absorbance of the blank with sample;

$$TIA = \frac{i}{100\%} \times \frac{m1 \times f1 \times f2}{m0}$$

TIA=trypsin inhibitor activity (mg/g);
i=inhibition percentage (%);
m0=mass of the test sample (g);
m1=mass of trypsin (g);
f1=dilution factor of the sample extract; and
f2=conversion factor based on the purity of trypsin.

Therefore, the measuring of the trypsin inhibitor activity preferably comprises the steps:
i) dissolving a sample of the feedstuff and/or feedstuff raw material in an alkali solution;
ii) diluting an aliquot of the solution obtained in step i) to provide a mixture in which the trypsin inhibitor concentration is sufficient for approximately 40 to 60% trypsin inhibition;
iii) adding a specific volume of a trypsin solution to the mixture obtained in step ii);
iv) adding BAPNA to the mixture obtained in step iii) to start the hydrolysis reaction of BAPNA with trypsin;
v) stopping the hydrolysis reaction;
vi) measuring the absorbance for the mixture obtained in step v) at a wavelength of 410 nm and calculating the inhibition with the formula $$i = \frac{(Ab - Abr) - (As - Abs)}{(Ar - Abr)}$$

where
i=inhibition percentage (%);
Ar=absorbance of the solution with standard;
Abr=absorbance of the blank with standard;
As=absorbance of the solution with sample; and
Abs=absorbance of the blank with sample;
and
vii) calculating the trypsin inhibitor activity with the formula $$TIA = \frac{i}{100\%} \times \frac{m1 \times f1 \times f2}{m0}$$

where
TIA=trypsin inhibitor activity (mg/g);
i=inhibition percentage (%);
m0=mass of the test sample (g);
f1=dilution factor of the sample extract; and
f2=conversion factor based on the purity of trypsin.

One trypsin unit is defined as the amount of enzyme, which will increase the absorbance at 410 nm by 0.01 unit after 10 minutes of reaction for each 1 ml of reaction volume. Trypsin inhibitor activity is defined as the number of trypsin units inhibited (TIU). The TIU per ml is calculated using the formula $$TUI[\text{ml}] = \frac{A_{blank} - A_{sample}}{0.01 \times V_{dl.smp.}}$$

where
$A_{blank}$=absorbance blank
$A_{sample}$=absorbance sample
$V_{dl.\ smp.}$=volume of the diluted sample solution in ml.

The thus obtained TUI is plotted against the volumes of the diluted sample solution, where the extrapolated value of the inhibitor volume to 0 ml gives the final TUI [ml]. Finally, the TUI per g sample is calculated with the formula TUI[g]=TUI[ml$^{-1}$]×d×50 where d=dilution factor (final volume divided by the amount taken).

The results of this analytical method should not exceed 10% of the average value for repeated samples.

Alternatively, the measuring of trypsin inhibitor activity therefore preferably comprises the steps i) dissolving a sample of a feedstuff and/or feedstuff raw material in an alkali solution;
ii) diluting an aliquot of the solution obtained in step i) to provide a mixture in which the trypsin inhibitor concentration is sufficient for approximately 40 to 60% trypsin inhibition;
iii) adding a specific volume of a trypsin solution to the mixture obtained in step ii);
iv) adding BAPNA to the mixture obtained in step iii) to start the hydrolysis reaction of BAPNA with trypsin;
v) stopping the hydrolysis reaction;
vi) measuring the absorbance for the mixture obtained in step v) at a wavelength of 410 nm and calculating the number of trypsin units inhibited (TUI) with the formula $$TUI[\text{ml}] = \frac{A_{blank} - A_{sample}}{0.01 \times V_{dl.smp.}}$$

where
$A_{blank}$=absorbance blank
$A_{sample}$=absorbance sample
$V_{dl.\ smp.}$=volume of the diluted sample solution in ml;
and
plotting the TUI obtained in step viii) against the volumes of the diluted sample solution, where the extrapolated value of the inhibitor volume to 0 ml gives the final TUI [ml]; and/or
vii) the TUI per g sample according to the formula TUI[g]=TUI[ml$^{-1}$]×d×50 where d=dilution factor (final volume divided by the amount taken).

The enzyme urease catalyzes the degradation of urea to ammonia and carbon dioxide. Since urease naturally occurs in soybeans, the measuring of the activity of this enzyme is the most common test to evaluate the quality of processed soybeans. Preferably, the measuring of the activity of urease is done according to the method of ISO 5506 (1988) or AOCS Ba 9-58. The method of AOCS Ba 9-58 determines the residual activity of urease as an indirect indicator to assess whether the protease inhibitors have been destroyed in the processing of a feedstuff raw material and/or feedstuff. Said residual activity of urease is measured as increase in the pH value in the test as consequence of the release of the alkaline compound ammonia into the media. The recommended level for said increase of the pH value is 0.01 to 0.35 unit rise (NOPA, 1997). A typical measuring of the urease activity of a feedstuff raw material and/or feedstuff is done like this: First, a solution of urea in a buffer comprising $NaH_2PO_4$ and $KH_2PO_4$ is prepared, e.g. 30 g of urea are added to 1 l of a buffer solution composed of 4.45 g of $Na_2HPO_4$ and 3.4 g $KH_2PO_4$ and the pH value of the thus obtained is measured. Subsequently, a sample of a feedstuff raw material and/or feedstuff, e.g. 0.2 g of a soybean sample, is added to this solution. A test tube or beaker with the thus obtained solution, suspension, dispersion, or emulsion is placed in a water bath, e.g. at a temperature of 30+/−5° C., preferably 30° C., for 20 to 40 minutes, preferably 30 minutes. Finally, the pH value of this solution, suspension, dispersion, or emulsion is measured, compared with the pH value of the original urea solution, and the difference is given as increase in pH.

The measuring of the urease activity therefore preferably comprises the steps of
i) preparing a solution of urea in a buffer comprising $Na_2HPO_4$ and $KH_2PO_4$;
ii) measuring the pH value of the solution of step i);
iii) adding a sample of a feedstuff raw material and/or feedstuff to the urea comprising solution;
iv) keeping the thus obtained solution, suspension, dispersion, or emulsion at a constant temperature for a certain time period, followed by measuring pH value of the solution, suspension, dispersion, or emulsion; and
v) expressing the difference between the pH values measured in steps ii) and iv) as increase in pH.

The measuring of the solubility of proteins in alkali, hereinafter also referred to as the solubility of proteins in an alkaline solution or the alkali solubility of proteins, is an effective method to distinguish over-processed products from correctly-processed products, e.g. according to DIN EN ISO 14244 (2016).

The measuring of the solubility of proteins in alkali or the alkali solubility of proteins comprises the determination of the percentage of protein that is solubilized in an alkali solution. Prior to the solubilization of the sample of a known weight of the feedstuff raw material and/or feedstuff, the nitrogen content of a sample with a specific weight is determined using a standard method for the determination of nitrogen, such as the Kjeldahl or Dumas method. The thus determined nitrogen content is referred to nitrogen content in total. Afterwards, a sample of the same weight and from the same source is suspended in an alkali solution of a defined concentration, preferably in an alkaline hydroxide solution, in particular in a potassium hydroxide solution. An aliquot of the thus obtained suspension is taken and centrifugated. Again, an aliquot of the thus obtained suspension is taken.

The nitrogen content in this liquid fraction is determined using a standard method for the determination of nitrogen, such as the Kjeldahl or Dumas method. The thus determined nitrogen content is compared with the nitrogen content in total and expressed as the percentage of the original nitrogen content of the sample.

The measuring of the alkali solubility of proteins preferably comprises the steps of i) determining the nitrogen content of a sample of a feedstuff raw material and/or feedstuff, preferably by a method such as the one according to Kjeldahl or Dumas;

ii) placing an aliquot of the sample of step i) in an alkali solution, preferably a solution of sodium hydroxide or potassium hydroxide, followed by stirring;

iii) centrifuging the suspension, solution, dispersion or emulsion obtained step ii);

iv) determining the nitrogen content in an aliquot of the solution or of the supernatant of the suspension, solution, dispersion or emulsion obtained from step iii) preferably by a method such as the one according to Kjeldahl or Dumas; and v) calculating the alkali solubility of proteins as the ratio of the nitrogen content determined in step iv) to the nitrogen content determined in step i).

Preferably, the alkaline solution used in step ii) has a pH value of from 11 to 14, in particular of from 12 to 13, for example 12.5. The amount of alkali, such as sodium hydroxide or potassium hydroxide, used for the preparation of the alkali solution depends on the volume of the solution to be prepared.

A typical alkali solution for the measuring of the alkali solubility of proteins has a pH value of 12.5, for example, and a solution of potassium hydroxide with a concentration of 0.036 mol/l or 0.2% by weight. In step ii) 1.5 g of a soybean sample are for example placed in 75 ml of a potassium hydroxide solution, followed by stirring at 8500 rpm (rounds per minute) for 20 minutes at 20° C. Subsequently, an aliquot, for example about 50 ml, of the suspension, solution, dispersion or emulsion thus obtained are taken and immediately centrifugated at 2500 g for 15 min. Afterwards, an aliquot, for example 10 ml, of the supernatant of the suspension, solution, dispersion or emulsion thus obtained are taken and the content of nitrogen in said aliquot is determined by means of standard methods for the determination of nitrogen, such as the method of Kjeldahl or Dumas. Finally, the results are expressed as the percentage of the nitrogen content of the sample.

The measuring of the protein dispersibility index (PDI) comprises measuring the solubility of proteins in water after blending a sample with water. This method also involves the determination of the nitrogen content in a sample of a known weight, which is typically done according to the same procedure as in the wet chemical analysis of proteins. The thus obtained nitrogen content is also referred to as the total nitrogen content. Further, the method also comprises the preparation of a suspension of a sample of the same weight as in the measuring of the nitrogen content is suspended in water, which is typically done using a high-speed blender. The thus obtained suspension is filtered and the filtrate is subjected to a centrifugation. The nitrogen content in the thus obtained supernatant is determined by using again a standard method for the determination, such as the Kjeldahl or Dumas method, described above. The thus obtained nitrogen content is also referred to as the nitrogen content in solution. The protein dispersibility index is finally calculated as the ratio of the nitrogen content in solution to the total nitrogen content and expressed as the percentage of the original nitrogen content of the sample.

The measuring of the protein dispersibility index preferably comprises the steps of i) determining the nitrogen content of a sample of a feedstuff raw material and/or feedstuff, preferably by a method such as the one according to Kjeldahl or Dumas;

ii) placing an aliquot of the sample of step i) in water;

iii) determining the nitrogen content in the dispersion obtained in step ii) preferably by a method such as the one according to Kjeldahl or Dumas; and iv) calculating the protein dispersibility index as the ratio of the nitrogen content determined in step iii) to the nitrogen content determined in step i).

Since the values for the protein dispersiblity index increases with decreasing particle size, the results obtained in the determination of the protein dispersiblity index depend on the particle size of the sample. It is therefore preferred to grind the sample to be subjected to the determination of the protein dispersiblity index, in particular with a 1 mm mesh size.

The procedure described above is in accordance with the Official Method Ba 10-65 of the American Oil Chemists' Society (A.O.C.S.), according to which the determination of the protein dispersibility index is preferably performed. The nitrogen content of for example a soy sample is determined by means of standard methods for the determination of nitrogen, such as the method of Kjeldahl or Dumas. An aliquot, for example 20 g, of the soy sample is placed in a blender, and (de-ionized) water, for example 300 ml, are added at 25° C., followed by stirring, for example at 8500 rpm for 10 minutes. The thus obtained suspension, solution, dispersion or emulsion is filtered and the thus obtained solution, dispersion or emulsion is centrifugated, e.g. at 1000 g for 10 minutes. Finally, the nitrogen content in the supernatant is determined by means of standard methods for the determination of nitrogen, such as the method of Kjeldahl or Dumas.

Many feedstuffs are processed which leads to possible damages to the amino acids. This may render some of the amino acids unavailable for their use in nutrition. This is particularly the case for lysine, which has an ε-amino group that can react with the carbonyl group of other compounds, e.g. reducing sugars, present in the diet to give compounds that may be partially absorbed from the gut but which do not have any nutritional value to the animal. The reaction of the ε-amino group of free and/or protein-bound lysine with reducing sugars during heat treatment is known as the Maillard reaction. This reaction gives both early and late Maillard products. The early Maillard products are structurally altered lysine derivatives that are called Amadori compounds, while the late Maillard products are called melanoidins. The melanoidins do not interfer with the normal analysis for lysine and have no influence on the digestibility values that are calculated. They only result in lower concentrations of lysine being absorbed. Therefore, the melanoidins are typically not identified in the regular analysis of amino acid. By comparison, the Amadori compounds do interfer with the amino acid analysis and give inaccurate lysine concentrations for the sample being analyzed. The lysine being bound in these compounds is called "blocked lysine" and is biologically unavailable because it is resistant to any gastrointestinal enzymatic degradation.

The reactive lysine content in a sample can be measured using the Sanger reagent, i.e. 1-fluoro-2,4-dinitrobenzene (FDNB). The lysine determined by means of this method is therefore also referred to as FDNB-lysine. The Sanger reagent converts lysine to the yellow dinitrophenyl (DNP)-lysine, which can be extracted and measured spectrophotometrically at a wavelength of 435 nm or by high-performance liquid chromatography.

Alternatively, the reactive lysine content in a sample can be also measured with the guanidination reaction using the mild reagent O-methylisourea. In this method the O-methylisourea only reacts with the ε-amino group of lysine, but it does not react with the α-amino group of lysine as long as the lysine is bound in a protein. Preference is therefore given for the guanidation reaction for the determination of the reactive lysine. The guanidination reaction of lysine gives a homoarginine, which is further derivatized with ninhydrin and the resulting change in absorption can be measured at wavelength of 570 nm.

Since it is an easier method to use, preference is given to use the guanidination reaction for the measuring of reactive lysine. The guanidation reaction involves the incubation of a sample of a feedstuff raw material and/or feedstuff in O-methylisourea. Preferably, the ratio of O-methylisourea to lysine is greater than 1000. The thus treated sample obtained from step i) is dried and analyzed for homoarginine, preferably by using ion exchange high performance liquid chromatography. Subsequently, said sample is derivatized with ninhydrin and the absorbance of the derivatized sample is measured at a wavelength of 570 nm. Afterwards, said sample is subjected to a hydrolysis, followed by the removal of the solvent to dryness of the sample. The weight and the molar quantity of honoarginine in the sample are measured. Finally, the amount of reactive lysine is calculated from the molar quantity of homoarginine.

The guanidation reaction for the measuring of reactive lysine therefore preferably comprises the steps of
i) incubating a sample of a feedstuff raw material and/or feedstuff in O-methylisourea;
ii) analyzing the sample obtained from step i) for homoarginine;
iii) derivatizing the sample obtained from step ii) with ninhydrin;
iv) measuring the absorbance of the sample obtained from step iii) at a wavelength of 570 nm;
v) subjecting the sample from step iv) to a hydrolysis;
vi) determining the weight and the molar quantity of homoarginine in the hydrolyzed sample; and
vii) determining the amount of reactive lysine from the molar quantity of homoarginine obtained in step vi).

However, not only lysine is subject to heat damages in the processing of feedstuff raw materials and/or feedstuffs but also other amino acids. According to the method of the present invention, the amounts of the amino acids methionine, cysteine, cystine, threonine, leucine, arginine, isoleucine, valine, histidine, phenylalanine, tyrosine, tryptophan, glycine, serine, proline, alanine, aspartic acid and glutamic acid are measured in a sample of a processed feedstuff raw material and/or feedstuff. To a certain degree amino acids are not only present as single compounds but also as oligopeptides, e.g. dipeptides, tripeptide or higher peptides, formed in an equilibrium reaction from two, three or even more amino acids. The amino group of an amino acid is usually too weak as a nucleophile to react directly with the carboxyl group of another amino acid or it is present in protonated form ($-NH_3^+$). Therefore, the equilibrium of this reaction is usually on the left side under standard conditions.

Notwithstanding, depending on the individual amino acids and the condition of a sample solution some of the amino acid to be determined may be not present as single compounds but to a certain degree as oligopeptides, e.g. dipeptide, tripeptide or higher peptide, formed of two, three or even more amino acids. Therefore, the sample of a feedstuff raw material and/or feedstuff should be subjected to a hydrolysis treatment, preferably an acidic or a basic hydrolysis, using for example hydrochloric acid or barium hydroxide. In order to facilitate the separation of the free amino acids and/or the identification and determination of the amino acids, the free amino acids are derivatized with a chromogenic reagent, if necessary. Suitable chromogenic reagents are known to the person skilled in the art. Subsequently, the free amino acids or the derivatized free amino acids are subjected to a chromatographic separation, in which the different amino acids are separated from each other because of the different retention times due to the different functional groups of the individual amino acids. Suitable chromatography columns, for example reversed phase columns, and suitable eluent solvent for the chromatographic separation of amino acids are known to the person skilled in the art. The separated amino acids are finally determined in the eluates from the chromatography step by comparison with a calibrated standard, prepared to the analysis. Typically, the amino acids, which are eluted from the chromatography column, are detected with a suitable detector, for example with a conductivity detector, a mass-specific detector or a fluorescence detector or a UV/VIS-detector depending when the amino acids were derivatized with a chromogenic reagent. This gives a chromatogram with peak areas and peak heights for the individual amino acids. The determination of the individual amino acids is performed by comparing the peak areas and peak heights with a calibrated standard or calibration curve for each amino acid. Since cystine ($HO_2C(-H_2N)$ CH—$CH_2$—S—S—$CH_2$—$CH(NH_2)$—$CO_2H$) and cysteine (HS—$CH_2$—$CH(NH_2)$—$CO_2H$) are both determined as cysteic acid ($HO_3S$—$CH_2$—$CH(NH_2)$—$CO_2H$), the method of measuring does not make any distinction between the two amino acids. However, this does not appear to have any influence on the precision of the measurement because cysteine is typically very susceptible for oxidations and is therefore usually present as cystine.

The measuring of the amount of at least one amino acid other than reactive lysine preferably comprises the steps of:
i) placing a sample of a feedstuff raw material and/or feedstuff in an aqueous acidic solution;
ii) hydrolyzing the amino acids contained in said sample in order to set them free;
iii) optionally, derivatizing the free amino acids obtained in step ii) with a chromogenic reagent which enhances the separation and spectral properties of the amino acids;
iv) separating the free amino acids obtained in step ii) and/or iii) using column chromatography; and
v) determining the amounts of the separated amino acids in the eluates obtained from step iv).

The procedure described above is in general used for the measuring of the total amount of lysine, which is required for the determination of the ratio of the reactive amount of lysine to the total amount of lysine, and for the measuring of at least one amino acid selected from the group consisting of methionine, cysteine, cystine, threonine, leucine, arginine, isoleucine, valine, histidine, phenylalanine, tyrosine, tryptophan, glycine, serine, proline, alanine, aspartic acid and glutamic acid.

The most critical point in the measuring of the amount of an amino acid is the sample preparation, which differs with respect to the type of ingredients and the amino acids of major interests. Most of the amino acids can be hydrolyzed by a hydrolysis in hydrochloric acid (6 mol/l) for a time period of up to 24 hours. For the sulfur containing amino acids methionine, cysteine, and cystine the hydrolysis is preceded by an oxidation with performic acid. For the measuring of the amount of tryptophan the hydrolysis is performed with barium hydroxide (1.5 mol/l) for 20 hours.

Prior to the measuring of the amount of an amino acid in a sample, the sample of the feedstuff raw material and/or feedstuff is preferably finely grounded. During said grinding of the feedstuff raw material and/or feedstuff any evolution of heat should be avoided in order to avoid any further influence of heat on the contents of the feedstuff raw material and/or feedstuff, in particular with respect to the parameters which are measured in step a) of the method according to the present invention.

The values obtained for the parameters in the measurings performed in steps a1) to a3) according to the present invention are plotted in step b) of the method according to the present invention as a function of the time of processing of the samples which were subjected to the measurings.

In the following, in the step c1) of the method according to the present invention the area in the plot of step b) is determined, where the value of the trypsin inhibitor activity, expressed as mg of trypsin per g sample, is more than 4,
the increase in the pH value is more than 0.35,
the value of the protein solubility in alkali, expressed as the percentage of protein in the sample that is soluble in an alkaline solution, is more than 85%, and/or
the value of the protein dispersibility index, expressed as the percentage of the original nitrogen content in the sample, is more than 40%, and the areas in the plot of step b), where at least one of these provisions are given, are assigned as under-processed.

Next, in the step c2) of the method according to the present invention the area in the plot of step b) is determined, where the value of the ratio of the reactive amount of lysine to the total amount of lysine is less than 90%,
the value of the protein dispersibility index, expressed as the percentage of the original nitrogen content of the sample, is less than 15%, and/or
the value of the protein solubility in alkali, expressed as the percentage of protein in the sample that is soluble in an alkaline solution, is less than 73%, and the areas in the plot of step b), where at least one of these provisions are given, are assigned as over-processed.

Finally, in the step c3) of the method according to the present invention the area in the plot of step b) is determined, where the value of the trypsin inhibitor activity, expressed as mg of trypsin per g sample, is less than 4,
the value of the protein solubility in alkali, expressed as the percentage of protein in the sample that is soluble in an alkaline solution, is between 73 and 85%,
the value of the protein dispersibility index, expressed as the percentage of the nitrogen content of the sample, is between 15 and 40%, and
the value of the ratio of the reactive amount of lysine to the total amount of lysine is at least 90%, and the areas in the plot of step b), where at least one of these provision are given, are assigned as adequately processed.

In addition or alternative, in the step c3) of the method according to the present invention, the areas obtained in steps c1) and c2) are subtracted from the plot of step b) and the thus obtained area are assigned as adequately processed.

In the rare case where the performance of both alternatives in step c3) gives different areas, the mean size is determined for these areas.

In order to facilitate a classification of the feedstuff raw material and/or the feedstuff subjected to the method according to the present invention as over-, under-, or adequately processed, it is further necessary to generate a processing scale (step d)), into which the processing conditions indicator of step e) is finally plotted. In said step d) a continuous scaling is assigned to the standardized and sorted areas. Preferably, said continuous scaling is assigned to the abscissa, x-axis, of the processing scale. The size of the areas determined in steps c1) to c3) of the method according to the present invention may differ in their size, in particular with respect to their height (extension of the areas in the y-direction or along the ordinate) and/or their length (extension of the areas in the x-direction or along the abscissa). Therefore, in step d) of the method according to the present invention the areas determined in steps c1) to c3) are standardized to equal size and the standardized areas are subsequently sorted from over-processing to under-processing or vice versa. Further, a continuous scale is assigned to the standardized and sorted areas.

According to present invention the values of the parameters obtained in steps a1) to a3) of the method according to the present invention are inserted in step e) of the method according to the present invention into a power series and the thus obtained values are used to determine the mean value, which is the so-called processing conditions indicator (PCI).

A typical power series corresponds to the formula $$P(x) = \sum_{n=0}^{i} \left( a_{n,0} + a_{n,1} \times x_n + a_{n,2} \times x_n^2 + a_{n,3} \times x_n^3 + \ldots + a_{n,i} \times x_i^n \right)$$

with
i=maximum number of the analyzed parameters;
n=specific parameter;
$x_n$=value of a specific parameter; and
$a_n$=weighing factor for the parameter.

In the context of the present invention the weighing factor is preferably an integer. Preferably, the weighing factor is an integer from 1 to 10.

Considering the formation of the mean value for the values from the power series, the so-called processing conditions indicator (PCI) is obtained by means of the formula $$PCI = \frac{i}{(i+1)} \sum_{n=0}^{i} \left( a_{n,0} + a_{n,1} \times x_n + a_{n,2} \times x_n^2 + a_{n,3} \times x_n^3 + \ldots + a_{n,i} \times x_i^n \right)$$

with
i=maximum number of the analyzed parameters;
n=specific parameter;
$x_n$=value of a specific parameter; and
$a_n$=weighing factor for the parameter.

The processing conditions indicator thus obtained in step e) may be plotted into the processing scale obtained in step d) to indicate whether the feedstuff raw material and/or feedstuff is over-processed, adequately-processed or under-processed.

Preferably, a series of samples of a processed feedstuff raw material and/or feedstuff from different time points of processing the same is subjected to the method according to the present invention in order to provide for a comprehensive sample population. Preferably, said series of sample comprises at least 100 samples, in particular 200, 300, 400, 500 or more samples. In case of a sample series the type of feedstuff raw material and/or feedstuff is preferably of the same type. Is further preferred to subjective more than one series of sample of preferably the same type of feedstuff raw material and/or feedstuff to the method according to the present invention. This has the advantage that also series of sample from different regions of the world can be subjected to the method according to the present invention. This allows to acquire a comprehensive data set, which also allows to determine the influence of processing influences on the nutritional value of a feedstuff raw material and/or feedstuff from different regions of the world. Thus, the method according to the present invention also considers the different climatic conditions in the various regions of the world, which together with the processing also have an influence on the nutritional value of feedstuff raw materials and/or feedstuffs.

Gross energy (GE), or heat of combustion, is the energy released by burning a sample of feed in excess oxygen in an adiabatic bomb calorimeter. In the context of the present invention the gross energy of a processed feedstuff raw material and/or feedstuff is therefore preferably measured in an adiabatic bomb calorimeter. The amount of gross energy depends exclusively on the chemical composition of the feed but chemical composition cannot predict the energetic transformation efficiency. Gross energy as such does not take into account any losses of energy during ingestion, digestion and metabolism of feed. In fact, 1 kg of starch has about the same gross energy value as 1 kg of straw even though most of the energy in the straw cannot be used by pigs or poultry because of missing digestive enzymes. Gross energy (GE) can be determined as follows:

$$GE[MJ/kg\ DM]=(4143+56\times EE[\%])+(15\times CP[\%])-(44\times ASH[\%]))\times 0.0041868,$$

with
- DM=dry matter,
- EE=ether extract,
- CP=crude protein,
- ASH=crude ash.

Digestive energy (DE) is the gross energy of feed minus the gross energy of feces. This energy system takes into account the digestibility of feed and gives a useful measure of the energy the animal may be able to use. The advantage of digestible energy is that it is easy to determine. The disadvantage however is that it does not take into account losses of energy in urine and as combustible gases and during metabolism. These losses vary among feedstuffs.

The digestible energy for growing pigs (DE_GP) can be determined as follows:

$$DE\_GP[MJ/kg\ DM]=(4168-(91\times ASH[\%\ DM]+(19\times CP[\%\ DM])+(39\times EE[\%\ DM])(36\times NDF[\%\ DM]))\times 0.0041868,$$

with
- ASH=crude ash,
- CP=crude protein,
- DM=dry matter,
- EE=ether extract,
- NDF=neutral detergent fiber.

The digestible energy for sows (DE_S) can be determined as follows:

$$DE\_S[MJ/kg\ DM]=1.041\times DE\_GP[MJ/kg\ DM]+0.0066\times CF[g/kg\ DM],$$

or $$DE\_S[MJ/kg\ DM]=1.041\times((4168-(91\times ASH[\%\ DM])+(19\times CP[\%\ DM])+(39\times EE[\%\ DM])(36\times NDF[\%\ DM]))\times 0.0041868)+0.066\times CF[\%\ DM]$$

with
- DE_GP=digestible energy of growing pigs,
- ASH=crude ash,
- CP=crude protein,
- DM=dry matter,
- EE=ether extract,
- NDF=neutral detergent fiber,
- CF=crude fiber.

The next level is the metabolizable energy (ME), which is defined as the digestible energy minus energy excreted in urine and as combustible gases. By taking into account these losses, metabolizable energy gives a better estimate of the energy available to the animal. Metabolizable energy corrects the digestible energy for some of the effects of quality and quantity of protein.

The metabolizable energy for growing pigs (ME_GP) can be determined as follows:

$$ME\_GP[MJ/kg\ DM]=(4194-(92\times ASH[\%\ DM])+(10\times CP[\%\ DM])+(41\times EE[\%\ DM])(35\times NDF[\%\ DM]))\times 0.0041868$$

with
- ASH=crude ash,
- CP=crude protein,
- DM=dry matter,
- EE=ether extract,
- NDF=neutral detergent fiber.

The metabolisable energy for sows (ME_S) can be determined as follows:

$$ME\_S[MJ/kg\ DM]=-3.96+(1.17\times ME\_GP[MJ/kg\ DM]+(0.132\times NDF[\%\ DM])$$

or $$ME\_S[MJ/kg\ DM]=-3.96+(1.17\times((4194-(92\times ASH[\%\ DM])+(10\times CP[\%\ DM])+(41\times EE[\%\ DM])-(35\times NDF[\%\ DM]))\times 0.0041868)+(0.132\times NDF[\%\ DM])$$

with
- ME_GP=metabolisable energy for growing pigs,
- ASH=crude ash,
- CP=crude protein,
- DM=dry matter,
- EE=ether extract,
- NDF=neutral detergent fiber.

Net energy (NE) is defined as metabolisable energy minus the heat increment, which is the heat produced (and thus energy used) during digestion of feed, metabolism of nutrients and excretion of waste. The energy left after these losses is the energy actually used for maintenance and for production, i.e. growth, gestation, lactation. Net energy is the only system that describes the energy that is actually used by the animal. Therefore, net energy is the most accurate and equitable way to date of characterizing the energy content of feed. However, net energy is much more difficult to determine and more complex than digestible energy and metabolisable energy.

The net energy for growing pigs (NE_GP) can be determined as follows:

$$NE\_GP[MJ/kg\ DM]=(2875+(43.8\times EE[\%\ DM])+(6.7\times ST[\%\ DM])-(55.9\times ASH[\%\ DM])(20.1\times(NDF[\%\ DM]-ADF[\%\ DM]))-(40.2\times NDF[\%\ DM]))\times 0.0041868$$

with
- ASH=crude ash,
- ADF=acid detergent fiber,
- DM=dry matter,
- EE=ether extract,
- NDF=neutral detergent fiber,
- ST=starch.

The net energy for sows (NE_S) can be determined as follows:

$$NE\_S[MJ/kg\ DM]=(0.703\times(DE\_S[MJ/kg\ DM])\times 0.0041868+(15.8\times EE[\%\ DM])+(4.7\times ST[\%\ DM])-(9.7\times CP[\%\ DM])+(9.8\times CF[\%\ DM]))\times 0.0041868$$

or $$NE\_S[MJ/kg\ DM]=(0.703\times((((4168-(91\times ASH[\%\ DM])+(19\times CP[\%\ DM])+(39\times EE[\%\ DM])(36\times NDF[\%\ DM]))\times 0.0041868\times 1.014)+(0.066\times CF[\%\ DM]))/0.0041868)+(15.8\times EE[\%\ DM])+(4.7\times ST[\%\ DM])-(9.7CP[\%\ DM])(9.8\times CF[(\%\ DM]))\times 0.0041868$$

with
- ASH=crude ash,
- ADF=acid detergent fiber,
- CF=crude fiber,
- CP=crude protein,
- DE_S=digestible energy for sows,
- DM=dry matter,
- EE=ether extract,
- NDF=neutral detergent fiber,
- ST=starch.

Apparent metabolisable energy considers the amount of nitrogen which has been used to build up body protein and which is therefore treated as if it had been excreted as uric acid. The values for the apparent metabolizable energy of poultry thus refer to values corrected to zero nitrogen retention (AMEn). Depending on the raw material different equations for the calculation of AMEn are applied. This general formula is applied for the raw material given in the formula below:

$$AMEn[MJ/kg\ DM]=(factor\ DM\times DM[\%]+factor\ ASH\times ASH[\%\ DM]+factor\ CP\times CP[\%\ DM]+factor\ EE\times EE[\%\ DM]+factor\ CF\times CF[\%\ DM]+factor\ NFE\times NFE[\%\ DM]+factor\ ST\times ST[\%\ DM]+factor\ SU\times SU[\%\ DM])/100$$

with
- ASH=crude ash,
- CF=crude fiber,
- CP=crude protein,
- DM=dry matter,
- EE=ether extract,
- NFE=nitrogen-free extract,
- ST=starch,
- SU=sugar.

DM [%]=100 as all data is used according to 100% dry matter standardization.

Dry matter standardized digestible energy (DE), metabolizable energy (ME), net energy (NE) and apparent metabolizable energy corrected to zero nitrogen retention for poultry (AMEn) is calculated by first standardizing the as-is nutrient composition (CP, EE, ASH, ST, NDF, ADF, CF) to 100% dry matter In the context of the present invention, the terms measuring digestible energy (DE), the metabolizable energy (ME), the net energy (NE) for pigs, and the apparent metabolizable energy corrected to zero nitrogen correction (AMEn) for poultry preferably comprises measuring the specific parameters mentioned above and below with regard to the determination of the individual energy value and inserting them into the respective equation to give the energy value in question.

TABLE 1

Specific raw materials and their energy factors (according to the European Table of Energy Values for Poultry Feedstuffs, 3$^{rd}$ edition 1989).

| Raw material | Factor DM | Factor ASH | Factor CP | Factor EE | Factor CF | Factor NFE | Factor ST | Factor SU |
|---|---|---|---|---|---|---|---|---|
| Bakery meal | 2 | | 14.43 | 31.84 | | 15.76 | | |
| Barley | 9.258 | −9.258 | | | | | | 6.81 |
| Blood meal | | | 14.43 | 27.18 | | | | |
| Corn | | | 15.15 | 35.75 | | 15.59 | | |
| Corn gluten meal | 17.72 | −17.72 | −9.931 | 11.73 | −69.34 | | | |
| Cottonseed meal | 8.898 | | | 19.72 | −12.91 | | | |
| DDGS | 16.38 | −16.38 | −4.066 | | −26.7 | | | |
| Feather meal | | | 13.89 | 24.07 | | | | |
| Fish meal | 15.01 | −14.26 | | 17.61 | | | | |
| Lupins | | | 16.59 | 33 | | 1.559 | | |
| Meat meal/MBM | 14.2 | −19.15 | | 25.1 | | | | |
| Milk powder | | | 17.13 | 32.62 | | 7.986 | | |
| Millet | | | 15.15 | 29.12 | | 15.94 | | |
| Oats | 12.98 | −12.98 | | 48.82 | −25.5 | | | |
| Peanut meal | 12.42 | | | 25.5 | −25.47 | | | |
| Peas | | | 15.51 | 31.06 | | 13.34 | | |
| Poultry byproduct meal | | | 12.98 | 31.06 | | | | |
| Rapeseed expeller | | | 13.71 | 34.94 | | 5.543 | | |
| Rapeseed meal | | | 13.71 | 27.18 | | 5.543 | | |
| Rapeseed whole | | | 12.62 | 38.05 | | 3.811 | | |
| Rice meal | 19.54 | −19.54 | −29.1 | 17.97 | −34.29 | | | |
| Rice bran | 19.54 | −19.54 | −29.1 | 17.97 | −34.29 | | | |
| Rye | | | 10.82 | 12.42 | | 12.99 | | |
| Sesame meal | | | 16.23 | 11.65 | | 3.811 | | |
| Sorghum | | | 12.98 | 32.23 | | 15.76 | | |
| Soybean meal % expeller | | | 15.69 | 29.51 | | 6.236 | | |
| Sunflower meal | 2.626 | −2.626 | 10.62 | 26.2 | | | | |

TABLE 1-continued

Specific raw materials and their energy factors (according to the European Table of Energy Values for Poultry Feedstuffs, 3rd edition 1989).

| Raw material | Factor DM | Factor ASH | Factor CP | Factor EE | Factor CF | Factor NFE | Factor ST | Factor SU |
|---|---|---|---|---|---|---|---|---|
| Tapioca (Cassava) | 16.38 | −16.38 | | | −34.64 | | | |
| Triticale | | | | | | 14.9 | | |
| Wheat | | | | | | 15.24 | | |
| Wheat bran | 16.78 | −16.78 | | | −69.2 | | | |
| Whey | | | 16.23 | 32.62 | | 7.968 | | |
| Yeast | | | 13.71 | 22.13 | | 14.72 | | |

The general formula taken into consideration digestible ether extract, digestible crude protein, and digestible nitrogen-free extract is applied for coconut meal (copra) and the digestibility factors given below were applied AMEn[MJ/kg DM]=(0.3883×digestible EE×EE[% DM]+0.1803×digestible CP×CP[% DM]+ 0.1732×digestible NFE×NFE[% DM])/100 with
DM=dry matter,
EE=ether extract,
CP=crude protein,
NFE=nitrogen-free extract.

TABLE 2

Digestibility factors for coconut meal (WPSA, 1989)

| Raw material | Condition | Factor digestibility CP | Factor digestibility EE | Factor digestibility NFE |
|---|---|---|---|---|
| Coconut meal (copra) | EE < 10% | 71 | 89 | 25 |
| Coconut meal (copra) | EE > 10% | 71 | 90 | 25 |

For all other raw materials (e.g. guar meal, mustard meal, palm kernel meal) the general formula based upon crude protein, ether extract, starch and sugar from the proximate analysis is applied:

AMEn[MJ/kg DM]=((15.51×CP[% DM])+(34.31× EE[% DM])+(16.69×ST[% DM])+(13.01×0.95× SU[% DM]))/100 with
DM=dry matter,
EE=ether extract,
ST=starch,
SU=sugar.

According to step f) of the method according to the present invention comprises the determination of the gross energy (GE), the digestible energy (DE), the metabolizable energy (ME), the net energy (NE) for pigs and/or the apparent metabolizable energy corrected to zero nitrogen retention (AMEn) for poultry in a sample of the same feedstuff raw material and/or feedstuff as in step a) of the said method. The determination of a specific energy value is done in a feeding trial with a specific sample set, preferably in accordance to the explanation given in context with the definition of the energy values in question.

However, when an energy value obtained in step f) above shall serve as a basis for the assumption of the processing influences on the energy value of another or even unknown feedstuff and/or feedstuff raw material, that energy value must be corrected. This correction is preferably done by a zero shifting of the maximum of the graph and/or equation, which expresses the at least one energy value in question obtained in step f) as a function of the processing condition indicator obtained in step e).

In one embodiment the method according to the present invention further comprises the steps of
g) expressing the digestible energy (DE), the metabolizable energy (ME), the net energy for pigs (NE), and/or the apparent metabolizable energy corrected to zero nitrogen retention (AMEn) for poultry obtained in step f) as a function of the processing conditions indicator obtained in step e) in an equation and/or as a graph; and
h) shifting the maximum of the at least one equation obtained in step g) and/or of the at least one graph obtained in step g) to 0.

Preferably, the at least one graph obtained in step g) above and in particular the shifted graph obtained in step h) above is plotted into the processing scale obtained in step d) of the method according to the present invention, and a scaling for the energy value(s) in kcal per kg dry matter or kJ per kg dry matter of the feedstuff raw material and/or feedstuff is assigned to the ordinate, y-axis, of the scale.

In addition or alternatively, the correction of an energy value is done by forming the ratio of a relative energy value, i.e. energy values obtained in step f), to the absolute energy value, i.e. the gross energy. The thus obtained ratios are expressed as a function of the processing conditions indicator in an equation and/or graph. The gross energy is preferably determined in an adiabatic bomb calorimeter according to standard procedures.

In another embodiment the method according to the present invention further comprises the steps of
i) forming at least one ratio of the group consisting of digestible energy to gross energy ratio (DE/GE), the metabolisable energy to gross energy ratio (ME/GE), the net energy to gross energy ratio (NE/GE) for pigs, and/or the apparent metabolisable energy corrected to zero nitrogen retention to gross energy ratio ($AME_n$/GE) for poultry, and
j) expressing the at least one ratio obtained in step i) as a function of the processing conditions indicator obtained in step e) in an equation and/or as a graph.

Preferably, the at least one graph obtained in step j) above is plotted into the processing scale obtained in step d) of the method according to the present invention, and a scaling for the energy value(s) in kcal per kg dry matter or kJ per kg dry matter of the feedstuff raw material and/or feedstuff is assigned to the ordinate of the scale.

As an alternative, it is also possible to express the energy values relative to their own individual maximum. This option therefore comprises setting the maximum of the graph and/or equation, which expresses the at least one energy value in question obtained in step f) as a function of the processing condition indicator obtained in step e), to 100%.

In an alternative embodiment the method according to the present invention further comprises the steps of
- k) expressing the digestible energy (DE), the metabolizable energy (ME), the net energy (NE) for pigs, and/or the apparent metabolizable energy corrected to zero nitrogen retention ($AME_n$) for poultry obtained in step f) as a function of the processing conditions indicator obtained in step e) in an equation and/or as a graph; and
- l) setting the maximum of the at least one equation obtained in step k) and/or of the at least one graph obtained in step k) to 100%.

Preferably, the at least one graph obtained in step k) above is plotted into the processing scale obtained in step d) of the method according to the present invention, and a scaling with 100% as the maximum of said graph is assigned to the ordinate, y-axis, of the scale.

The use of the at least one equation and/or graph obtained in step j) above and the determination of the PCI obtained by the method according to the present invention allow the determination of the digestible energy to gross energy ratio (DE/GE), the metabolisable energy to gross energy ratio (ME/GE), the net energy to gross energy ratio (NE/GE) for pigs, and/or the apparent metabolisable energy corrected to zero nitrogen retention to gross energy ($AME_n$/GE) for poultry in an unknown sample of a processed feedstuff raw material and/or feedstuff. The subsequent determination of the gross energy in said sample, e.g. by use of an adiabatic bomb calorimeter, then allows to determine the at least one energy value in question.

In another embodiment the method according to the present invention further comprises the steps of
- A1) measuring the gross energy (GE) of a sample of a processed feedstuff raw material and/or feedstuff, wherein said sample is of unknown origin or of the same origin as in step a) above;
- A2) performing the steps a) to e) of the method according to the present invention with the sample of step A1) to give the processing conditions indicator (PCI) of the sample;
- A3) inserting the processing conditions indicator (PCI) obtained in step A2) into the equation of step j) of the method for the determination of the processing influences on the energy value of a feedstuff raw material and/or feedstuff to obtain the digestible energy to gross energy ratio (DE/GE), the metabolizable energy to gross energy ratio (ME/GE), the net energy to gross energy ratio (NE/GE) for pigs, and/or the apparent metabolizable energy corrected to zero nitrogen retention to gross energy ratio ($AME_n$/GE) for poultry and/or reading off DE/GE, ME/GE, NE/GE, and/or $AME_n$/GE from the graph of step j) of the method for the determination of the processing influences on the energy value of a feedstuff raw material and/or feedstuff as a function of the processing conditions indicator (PCI) obtained in step A2); and
- A4) multiplying the gross energy (GE) obtained in step A1) with the digestible energy to gross energy ratio (DE/GE), the metabolizable energy to gross energy ratio (ME/GE), the net energy to gross energy ratio (NE/GE) for pigs, and/or the apparent metabolizable energy corrected to zero nitrogen retention to gross energy ratio ($AME_n$/GE) for poultry obtained in step A3) to give the corrected digestible energy ($DE_{correct.}$), the corrected metabolizable energy ($ME_{correct.}$), the corrected net energy ($NE_{correct.}$) for pigs and/or the corrected apparent metabolizable energy corrected to zero nitrogen retention ($AME_{n,\ correct.}$) for poultry.

Preferably, the amount of all amino acids mentioned in step a3) are measured.

Steps A3) is not limited in the determination of a specific corrected energy value. However, the net energy (NE) for pigs and the apparent metabolizable energy corrected to zero nitrogen retention ($AME_n$) for poultry are the most significant energy values for the assessment of a feedstuff raw material and/or feedstuff for pigs or poultry. It is therefore preferred that in step A3) above the NE/GE or the $AME_n$/GE is obtained by inserting the PCI into the equations of step j) of the method for the determination of the processing influences on the energy value of a feedstuff raw material and/or feedstuff and/or the NE/GE, and/or $AME_n$/GE is read off from the graph of step j) of said method.

The processed feedstuff raw material and/or feedstuff in step A1) of the computer-implemented method for the assessment of processing influences on the energy value of a feedstuff raw material and/or feedstuff can be of unknown origin or of the same origin as the processed feedstuff raw material and/or feedstuff of step a) of the computer-implemented method for the determination of processing influences on the energy value of a feedstuff raw material and/or feedstuff.

Alternatively, the use of the at least one equation and/or graph obtained in step h) above and the determination of the PCI of a sample of an unknown feedstuff raw material and/or feedstuff allow the determination of a correction factor for a specific type of energy value. The actual or corrected energy values are then obtained by subtracting this correction factor from the digestible energy (DE), the metabolizable energy (ME), the net energy (NE) for pigs, and/or the apparent metabolizable energy corrected to zero nitrogen retention ($AME_n$) for poultry as obtained from the formula above and feeding trials.

In a further embodiment the method according to the present invention further comprises the steps of
- B1) measuring the digestible energy (DE), the metabolizable energy (ME), the net energy (NE) for pigs, and/or the apparent metabolizable energy corrected to zero nitrogen retention ($AME_n$) for poultry of a sample of a processed feedstuff raw material and/or feedstuff, wherein said sample is of unknown origin or of the same origin as in step a) above;
- B2) performing the steps a) to e) of the method according to the present invention with the sample of step B1) to give the processing conditions indicator (PCI) of the sample;
- B3) inserting the processing conditions indicator (PCI) obtained in step B2) into the equation of step h) of the method for the determination of the processing influences on the energy value of a feedstuff raw material and/or feedstuff to obtain a correction factor and/or reading off the correction factor from the graph of step h) of the method for the determination of the processing influences on the energy value of a feedstuff raw material and/or feedstuff as a function of the processing conditions indicator (PCI) obtained in step B2); and
- B4) subtracting the correction factor obtained in step B3) from the digestible energy (DE), the metabolizable energy (ME), the net energy (NE) for pigs, and/or the apparent metabolizable energy corrected to zero nitrogen retention ($AME_n$) for poultry obtained in step B1) to give the corrected digestible energy ($DE_{correct.}$), the corrected metabolizable energy ($ME_{correct.}$), the corrected net energy ($NE_{correct.}$) for pigs, and/or the corrected apparent metabolizable energy corrected to zero nitrogen retention ($AME_{n,\ correct.}$) for poultry.

Preferably, the amount of all amino acids mentioned in step a3) are measured.

The methods above involve either an absolute correction (see step B4 of the method above) or an assessment of energy values on an absolute basis, specifically the ratios of energy values to gross energy (see steps A3 and A4 of the method above). In any case, these options give absolute energy values, in kcal per kg of dry matter. As an alternative, it is also possible to assess the corrected energy value of a sample of a processed feedstuff raw material and/or feedstuff on a relative basis. In this option, the corrected energy values are obtained as function values of the PCI of a sample of an unknown feedstuff raw material and/or feedstuff from the equations and/or graphs obtained in step 1) above, whose maxima were set to 100%. Therefore, this option does not give an absolute value in kcal per kg of dry matter but gives the relative energy content in percent.

In yet another embodiment the method according to the present invention further comprises the steps of C1) measuring the digestible energy (DE), the metabolizable energy (ME), the net energy (NE) for pigs, and/or the apparent metabolizable energy corrected to zero nitrogen retention ($AME_n$) for poultry of a sample of a processed feedstuff raw material and/or feedstuff, wherein said sample is of unknown origin or of the same origin as in step a) above;

C2) performing the steps a) to e) of the method according to the present invention with the sample of step C1) to give the processing conditions indicator (PCI) of the sample;

C3) inserting the processing conditions indicator (PCI) obtained in step C2) into the equation of step 1) above and/or reading off the function value from the graph obtained in step 1) above as a function of the processing conditions indicator (PCI) obtained in step C2) to give the relative corrected digestible energy ($DE_{correct.,\ rel.}$), the relative corrected metabolizable energy ($ME_{correct.,\ rel.}$), the relative corrected net energy ($NE_{correct.,\ rel.}$) for pigs, and/or the relative corrected apparent metabolizable energy corrected to zero nitrogen retention ($AME_{n,\ correct.,\ rel.}$) for poultry; and C4) multiplying the digestible energy (DE), the metabolizable energy (ME), the net energy (NE) for pigs, and/or the apparent metabolizable energy corrected to zero nitrogen retention ($AME_n$) for poultry obtained in step C1) with the relative corrected digestible energy ($DE_{correct.,\ rel.}$), the relative corrected metabolizable energy ($ME_{correct.,\ rel.}$), the relative corrected net energy ($NE_{correct.,\ rel.}$) for pigs, and/or the relative corrected apparent metabolizable energy corrected to zero nitrogen retention ($AME_{n,\ correct.,\ rel.}$) for poultry obtained in step C3) to give the corrected digestible energy ($DE_{correct.}$), the corrected metabolizable energy ($ME_{correct.}$), the corrected net energy ($NE_{correct.}$) for pigs, and/or the corrected apparent metabolizable energy corrected to zero nitrogen retention ($AME_{n,\ correct.}$) for poultry.

Preferably, the amount of all amino acids mentioned in step a3) are measured.

The processed feedstuff raw material and/or feedstuff in step A1), B1) and/or C1) of the computer-implemented methods for the assessment of processing influences on the energy value of a feedstuff raw material and/or feedstuff can be of unknown origin or of the same origin as the processed feedstuff raw material and/or feedstuff of step a) of the computer-implemented method for the determination of processing influences on the energy value of a feedstuff raw material and/or feedstuff.

The determination of the digestible energy (DE), the metabolizable nergy (ME), the net energy (NE) for pigs, and/or the apparent metabolizable energy corrected to zero nitrogen retention ($AME_n$) for poultry is preferably done in accordance to the explanation given in context with the definition of the energy values in question.

Both feeding trials and the measurements in the steps a1) to a3) of the method according to the present invention are rather time and cost consuming. Near infrared measurements (NIR) of the respective feedstuff raw material and/or feedstuff would be a more time and cost efficient alternative for determining the influences of processing on the energy value(s) of a feedstuff raw material and/or feedstuff. However, near infrared spectroscopy does not give the results with the desired precision; rather, it often leads to contradictory results. Accordingly, neither the measurements nor near infrared spectroscopy alone are suitable for a cost and time efficient determination of processing influences on the energy value of a feedstuff raw material and/or feedstuff.

According to the present invention this problem is solved in that the near infrared absorptions obtained for a sample of a feedstuff raw material and/or feedstuff are correlated with the corresponding values of the measurements of the same. The thus obtained correlation of the values of the measurements with the absorptions of the NIR measurement is preferably expressed in a calibration equation and/or plotted as a calibration graph, which facilitates the matching of the absorptions of the NIR measurements of other sample with the corresponding exact values for the parameters based on the measurements.

Another object of the present invention is therefore a computer-implemented method for the assessment of the processing influences on the energy value of a feedstuff raw material and/or feedstuff, comprising the steps of D1) recording a near infrared spectrum of a sample of the same feedstuff raw material and/or feedstuff as in step a) of the method for the determination of the processing influence on the energy value of a feedstuff raw material and/or feedstuff;

D2) matching the absorption intensities at the respective wavelengths or wavenumbers in the near infrared spectrum obtained in step D1) with the corresponding parameters and their values determined in steps a1) measuring at least one parameter selected from the group consisting of trypsin inhibitor activity, urease activity, protein solubility in alkali and protein dispersibility index of the sample;

a2) determining the ratio of the reactive amount of lysine to the total amount of lysine comprising measuring the reactive amount of lysine and the total amount of lysine in the sample, followed by the formation of the ratio of the reactive amount of lysine to the total amount of lysine; and a3) measuring the amount of at least one amino acid selected from the group consisting of methionine, cysteine, cystine, threonine, leucine, arginine, isoleucine, valine, histidine, phenylalanine, tyrosine, tryptophan, glycine, serine, proline, alanine, aspartic acid and glutamic acid in the sample; and D3) plotting the matching of step D2) as a calibration graph and/or expressing the parameters determined in steps a1) to a3) in a calibration equation as a function of the absorption intensities at the respective wavelengths or wavenumbers matched in step D2).

Depending on the spectrometer used, the near-infrared (NIR) spectra of step D1) or of any other step mentioned below can be recorded at wavelengths between 400 and 2,500 nm with any suitable infrared spectroscopes working either on the monochromator principle or on the Fourier transform principle. Preferably, the NIR spectra are recorded between 1,000 and 2,500 nm. Wavelengths are easily converted into the respective wavenumbers and therefore, the NIR spectra can also be recorded at the corresponding wavenumbers. Since the organic compounds to be determined in the method according to the present invention, i.e. proteins and amino acids, are rich in O—H bonds, C—H bonds and N—H bonds, they are suitable for the detection by means of near-infrared spectroscopy. However, a biological sample such as a feedstuff contains a multitude of different organic compounds and thus represents a complex matrix. Notwithstanding every biological substance has a unique near-infrared spectrum, comparable to an individual fingerprint. Consequently, two biological substances having exactly the same spectrum can be assumed to have the same physical and chemical composition and thus to be identical. On the other hand, if two biological substances have different spectra, it can be assumed that they are different, either in terms of their physical or chemical characteristics or in both terms. Due to their individual and highly specific absorption bands the signals of organic compounds and their intensities in NIR spectra can be easily attributed and correlated to a specific organic compound and its concentration in a sample of known weight. Thus, the NIR spectroscopy allows a reliable prediction or assessment of for example the amount of amino acids and proteins in a sample. Since the same sample of a specific feedstuff raw material and/or feedstuff is subjected to the measurements in step a) and to the NIR spectroscopy in step D1), it is also possible to attribute and correlate absorptions and their intensities in an NIR spectrum to parameters, such as the trypsin inhibitor activity, urease activity, protein solubility in alkali and protein dispersibility index, and to their values and changes. In the next step, the used near infrared spectrometer must to be calibrated. Once, the absorption intensities at the respective wavelengths or wavenumbers have been successfully matched, i.e. attributed and correlated to the parameters of interest and their values, the NIR spectroscopy allows a reliable prediction or assessment of the influences of processing on the nutritional value of a feedstuff raw material and/or feedstuff. For this purpose a large number of NIR spectra, e.g. 100, 200, 300, 400, 500 or more, of a feedstuff raw material and/or feedstuff are recorded, and the absorption intensities at the respective wavelengths or wavenumbers are matched with the corresponding parameters and their values. When the sample of the sample of step D1) is not translucent, the reflectance of the emitted light from the sample is measured and the difference between the emitted light and the reflected light is given as absorption.

The thus obtained absorption intensities are used in the following steps, e.g. step D2) and D3) above and steps D4) and D5) below.

In one embodiment the computer-implemented method for the assessment of the processing influences on the energy value of a feedstuff raw material and/or feedstuff further comprises the steps of D4) matching the absorption intensities at the respective wavelengths or wavenumbers in the near infrared spectrum of a sample obtained in step D2) with the processing conditions indicator of the same sample in step e) of the method for the determination of the processing influences on the energy value of a feedstuff raw material and/or feedstuff; and D5) plotting the matching of step D4) as a calibration graph and/or expressing the processing conditions indicator in a calibration equation as a function of the absorption intensities at the respective wavelengths or wavenumbers matched in step D4).

After completion of the near infrared calibrations, near infrared spectroscopy can be used as a routine method for assessing the processing influences on the energy value of a processed feedstuff raw material and/or feedstuff of unknown origin and in particular of unknown degree of processing.

In a further embodiment the computer-implemented method for the assessment of the processing influences on the energy value of a feedstuff raw material and/or feedstuff further comprises the steps of E1) recording a near infrared spectrum of a sample of a processed feedstuff raw material and/or feedstuff, wherein said sample is of unknown origin or of the same origin as in step a) above;

E2) reading off the values of at least one of the parameters of steps a1) to a3) of the method for the determination of the processing influences on the energy value of a feedstuff raw material and/or feedstuff matching to the absorptions in the near infrared spectrum obtained in step E1) from the calibration graph of step D3), and/or inserting the absorption intensities at the respective wavelengths or wavenumbers in the near infrared spectrum obtained in step E1) into the calibration equation of step D3) to obtain the values for the parameters of steps a1 to a3) of the method for the determination of the processing influences on the energy value of a feedstuff raw material and/or feedstuff;

E3) inserting the values for the parameters obtained in step E2) into power series and forming the mean of the values obtained from each power series, wherein said mean is designated as the processing conditions indicator (PCI); and/or E4) reading off the processing conditions indicator from the calibration graph of step D5) and/or inserting the absorption intensities at the respective wavelengths or wavenumbers into the calibration equation of step D5) to obtain the processing conditions indicator (PCI).

The processed feedstuff raw material and/or feedstuff in step E1) of the computer-implemented method for the assessment of processing influences on the energy value of a feedstuff raw material and/or feedstuff can be of unknown origin or of the same origin as the processed feedstuff raw material and/or feedstuff of step a) of the computer-implemented method for the determination of processing influences on the energy value of a feedstuff raw material and/or feedstuff.

In one embodiment the sample of the feedstuff raw material and/or feedstuff in step E1) of the computer-implemented method for the assessment of the processing influences on the energy value of a feedstuff raw material and/or feedstuff is of unknown origin or is of the same origin as in step a) of the method for the determination of the processing influences on the energy value of a feedstuff raw material and/or feedstuff.

Preferably, in the step E2) the same parameters are determined as in the steps a1) to a3) of the method for the determination of the processing influences on the energy value of a feedstuff raw material and/or feedstuff.

The processing conditions indicator obtained in step E3 and/or E4 above allows to determine a correction factor for the digestible energy (DE), the metabolizable (ME), the net energy (NE) for pigs, and/or the apparent metabolizable energy corrected to zero nitrogen retention ($AME_n$) of the sample of a processed feedstuff raw material and/or feedstuff. The thus obtained correction factor then allows to obtain the respective corrected energy values for said sample by use of the at least one equation and/or at least one graph obtained in step h) above. In addition or alternatively, it is also possible to obtain said correction factor by measuring the gross energy for the sample in question, determining the ratio of one of the energies in question to the gross energy by use of the processing conditions indicator obtained in step E3 and/or E4 above and the at least one equation and/or graph of step j) above, and multiplication of the thus determined ratio with the gross energy.

In another embodiment the computer-implemented method for the assessment of the processing influences on the energy vale of a feedstuff raw material and/or feedstuff therefore further comprises the steps of F1) measuring the digestible energy (DE), the metabolizable energy (ME), the net energy (NE) for pigs, and/or the apparent metabolizable energy corrected to zero nitrogen retention ($AME_n$) for poultry in a sample of the same feedstuff raw material and/or feedstuff as in step E1);

F2) inserting the processing conditions indicator obtained in step E3) and/or E4) into the equation for the digestible energy (DE), the metabolizable energy (ME), the net energy (NE) for pigs, and/or the apparent metabolizable energy corrected to zero nitrogen retention ($AME_n$) for poultry of step h) of the method for the determination of the processing influences on the energy value of a feedstuff raw material and/or feedstuff to obtain a correction factor and/or reading off the correction factor from the corresponding graph of step h) of the method for the determination of the processing influences on the energy value of a feedstuff raw material and/or feedstuff as a function of the processing conditions indicator; and F3) subtracting the correction factor obtained in step F2) from the digestible energy (DE), the metabolizable energy (ME), the net energy for pigs (NE), and/or the apparent metabolizable energy corrected to zero nitrogen retention for poultry ($AME_n$) obtained in step F1) to give the corrected digestible energy ($DE_{correct.}$), the corrected metabolizable energy ($ME_{correct.}$), the corrected net energy ($NE_{correct.}$) for pigs, and/or the corrected apparent metabolizable energy corrected to zero nitrogen retention ($AME_{n, correct.}$) for poultry.

The determination of the digestible energy (DE), the metabolizable energy (ME), the net energy (NE) for pigs, and/or the apparent metabolizable energy corrected to zero nitrogen retention ($AME_n$) for poultry is preferably done in accordance to the explanation given in context with the definition of the energy values in question.

In an alternative and/or additional embodiment the computer-implemented method for the assessment of the processing influences on the energy vale of a feedstuff raw material and/or feedstuff therefore further comprises the steps of G1) measuring the gross energy (GE) in a sample of the same feedstuff raw material and/or feedstuff as in step E1);

G2) inserting the processing conditions indicator obtained in step E3) and/or E4) into the equation of step j) of the method for the determination of the processing influences on the energy value of a feedstuff raw material and/or feedstuff to obtain the digestible energy to gross energy ratio (DE/GE), the metabolizable energy to gross energy ratio (ME/GE), the net energy to gross energy ratio (NE/GE) for pigs, and/or the apparent metabolizable energy corrected to zero nitrogen retention to gross energy ratio ($AME_n$/GE) for poultry and/or reading off any of said ratios as a function of the processing conditions indicator (PCI) from the graph of step j) of the method for the determination of the processing influences on the energy value of a feedstuff raw material and/or feedstuff; and G3) multiplying the gross energy (GE) obtained in step G1) with the digestible energy to gross energy ratio (DE/GE), the metabolizable energy to gross energy ratio (ME/GE), the net energy to gross energy ratio (NE/GE) for pigs and/or the apparent metabolizable energy corrected to zero nitrogen retention to gross energy ratio ($AME_n$/GE) for poultry obtained in step G2) to give the corrected digestible energy ($DE_{correct.}$), the corrected metabolizable energy ($ME_{correct.}$), the corrected net energy ($NE_{correct.}$) for pigs, and/or the corrected apparent metabolizable energy corrected to zero nitrogen retention ($AME_{n, correct.}$) for poultry.

The determination of the gross energy (GE) in step G1) is preferably determined in an adiabatic bomb calorimeter according to standard procedures.

Based on the data set and the respective calibrations obtained in the methods according to the present invention the method according to the present invention also allows to perform an assessment of the processing influences on the energy value of a feedstuff raw material and/or feedstuff from an unknown origin. Alternatively, the sample in step E1) of the method for the assessment of the processing influences on the energy value of a feedstuff raw material and/or feedstuff is of the same origin as in step a) of the method for the determination of the processing influences on the energy value of a feedstuff raw material and/or feedstuff.

As an alternative to the absolute assessment of corrected energy values in the methods above, the processing conditions indicator obtained in step E3 and/or E4 above also allows the determination of relative corrected values of the sample of a processed feedstuff raw material and/or feedstuff. In this option, the corrected digestible energy ($DE_{correct.}$), the corrected metabolizable energy ($ME_{correct.}$), the corrected net energy for pigs ($NE_{correct.}$), and/or the corrected apparent metabolizable energy corrected to zero nitrogen for poultry ($AME_{n, correct.}$) are obtained as a function value of the processing conditions indicator from the at least one equation and/or at least one graph obtained in step l) of the computer-implemented method for the determination of processing condition influences on the energy of a feedstuff raw material and/or feedstuff.

In an alternative embodiment the computer-implemented method for the assessment of the processing influences on the energy vale of a feedstuff raw material and/or feedstuff therefore further comprises the step of H1) measuring the digestible energy (DE), the metabolizable (ME), the net energy (NE) for pigs, and/or the apparent metabolizable energy corrected to zero nitrogen retention ($AME_n$) for poultry in a sample of the same feedstuff raw material and/or feedstuff as in step E1);

H2) inserting the processing conditions indicator (PCI) obtained in step E3) and/or E4) into the equation of step l) above in order to obtain the relative corrected digestible energy ($DE_{correct.,rel.}$), the relative corrected metabolizable energy ($ME_{correct.,rel.}$), the relative corrected net energy ($NE_{correct.,rel.}$) for pigs and/or the relative corrected apparent metabolizable energy corrected to zero nitrogen retention ($AME_{n,\ correct,rel.}$) for poultry of the sample of step E1) and/or reading off any of said energy values as a function of the processing conditions indicator (PCI) obtained in step E3) and/or E4) from the graph of step l) above; and H3) multiplying the digestible energy (DE), the metabolizable energy (ME), the net energy (NE) for pigs, and/or the apparent metabolizable energy corrected to zero nitrogen retention ($AME_n$) for poultry obtained in step H1) with the relative corrected digestible energy ($DE_{correct.,rel.}$), the relative corrected metabolizable energy ($ME_{correct.,rel.}$), the relative corrected net energy ($NE_{correct.,rel.}$) for pigs and/or the relative corrected apparent metabolizable energy corrected to zero nitrogen retention ($AME_{n,\ correct,rel.}$) for poultry obtained in step H2) to give the corrected digestible energy ($DE_{correct.}$), the corrected metabolizable energy ($ME_{correct.}$), the corrected net energy ($NE_{correct.}$) for pigs and/or the corrected apparent metabolizable energy corrected to zero nitrogen retention ($AME_{n,\ correct.}$) for poultry.

The determination of the digestible energy (DE), the metabolizable energy (ME), the net energy (NE) for pigs, and/or the apparent metabolizable energy corrected to zero nitrogen retention ($AME_n$) for poultry in step H1) is preferably done in accordance to the explanation given in context with the definition of the energy values in question.

For a feedstuff raw material and/or feedstuff which is considered over-processed and thus has a deficit in energy value, the method according to the present invention also allows to determine the difference between the desired energy value and the real energy value in a feedstuff raw material and/or feedstuff by comparing the maximum of the energy value of a feedstuff raw material and/or feedstuff according to the calibration equation and/or calibration graph obtained in step j) with the specific energy value in the feedstuff raw material and/or feedstuff obtained in the method according to the present invention for a specific sample.

In a further embodiment the computer-implemented method for assessing the processing influences on the energy value of a feedstuff raw material and/or feedstuff further comprises the steps of 11) determining the energy deficit in the feedstuff raw material and/or feedstuff by determining the difference between the digestible energy (DE), the metabolizable energy (ME), the net energy (NE) for pigs and/or the apparent metabolizable energy corrected to zero nitrogen retention ($AME_n$) for poultry obtained in step B1) and/or F1) and the corrected digestible energy ($DE_{correct.}$), the corrected metabolizable energy ($ME_{correct.}$), the corrected net energy ($NE_{correct.}$) for pigs, and/or the corrected apparent metabolizable energy corrected to zero nitrogen ($AME_{n,\ correct.}$) for poultry of step A4), B4), C4), F3), G3), and/or H3); and 12) when an energy deficit was determined in step 11), calculating the amounts of at least one feedstuff raw material and/or feedstuff required to give a feed with a specific energy value.

Preferably, in step 12) above the amount of each feedstuff raw material and/or feedstuff for a feed is calculated in order to provide the feed with a specific energy value. Preferably, said feed is a mixed feed.

The method according to the present invention also allows a visualization of an energy value, a corrected energy value and/or a ratio of said energy value to the gross energy obtained above as a function of the processing conditions indicator, preferably the respective energy values or ratios are plotted into the processing scale obtained in step d) above.

In a further embodiment the computer-implemented method for assessing the processing influences on the energy value of a feedstuff raw material and/or feedstuff further comprises the step of J) plotting the digestible energy (DE), the metabolizable energy (ME), the net energy (NE) for pigs, and/or the apparent metabolizable energy corrected to zero nitrogen retention ($AME_n$) for poultry of step B1) and/or F1) and/or the corrected digestible energy ($DE_{correct.}$), the corrected metabolizable energy ($ME_{correct.}$), the corrected net energy ($NE_{correct.}$) for pigs, and/or the corrected apparent metabolizable energy corrected to zero nitrogen retention ($AME_{n,\ correct.}$) for poultry of step A4), B4), C4), F3), G3), and/or H3) and/or the ratio of any of these energies to the gross energy of step A1 and/or step G1) into the processing scale of step d) of any of the methods above in order to indicate whether the feedstuff raw material and/or feedstuff is over-processed, adequately-processed or under-processed.

The methods according to the present invention are not subject to any limitation regarding the feedstuff raw material and/or feedstuff. Notwithstanding, the feedstuff raw material and/or feedstuff, which is used in the methods according to the present invention, is preferably soy, soybeans, preferably full-fat soybeans, and/or soybean products, preferably soybean meal and soybean cake/expellers. This is because soy, soybeans and soybean products are the most relevant feedstuffs raw material and/or feedstuffs.

In one embodiment of the methods according to the present invention the feedstuff raw material and/or feedstuff is soy, soybeans, and/or a soybean product.

The methods according to the present invention are carried out on a computer. This allows to perform the methods according the present invention as a routine method. In this case the calibration equations and/or calibration graphs obtained in the methods according to the present invention are stored on the computer or a cloud. It is therefore possible to perform a method according to the present invention by a first computer, and the calibration equations or equations are stored on said first computer. Alternatively, the calibration equations or equations can be stored on a second computer, which forms a network with the first computer. Additionally or alternatively, the data set and the calibration equation(s) and/or the calibration graph(s) are stored in a cloud to which the first computer has access and in this case the first computer and the cloud form a network.

In one embodiment of the computer-implemented methods according to the present invention i) the equation and/or graph obtained in step j) above is/are stored on a computer or a cloud, ii) the equation and/or graph obtained in step h) above is/are stored on a computer or a cloud, iii) the equation and/or graph obtained in step l) above is/are stored in a computer or a cloud, iv) the calibration graph and/or calibration equation of step D3) above and the equation and/or graph of step h) above are stored on a computer or cloud, v) the calibration graph and/or the calibration equation of step D5) above and the equation and/or graph of step j) above are stored on a computer or cloud, and/or vi) the processing scale obtained in step d) above is stored on a computer and/or a cloud.

A further object of the present invention is therefore also a system for determining and/or assessing the processing influences on the energy value of a feedstuff raw material and/or feedstuff, comprising a processing unit adapted for carrying out the methods and/or processes according to the present invention.

It is also possible to prepare a feed based on the energy values, the energy deficit, where appropriate, and on the processing condition of a processed feedstuff raw material and/or feedstuff determined in any of the methods according to the present invention. When the feedstuff raw material and/or feedstuff has an energy deficit, it is then preferred to supplement the amount of a feedstuff raw material and/or feedstuff calculated above, which is required to give a feed with a specific energy value. When the feedstuff raw material and/or feedstuff is under-processed, it is possible to adjust its processing condition, by processing it further until it is adequately-processed.

In a further embodiment the method according to the present invention further comprises the steps K) adjusting the energy value of the feedstuff, including
K1) determining the difference between the digestible energy (DE), the metabolizable energy (ME), the net energy (NE) for pigs, and/or the apparent metabolizable energy corrected to zero nitrogen retention ($AME_n$) for poultry obtained in step B1), and/or F1) above and the corrected digestible energy ($DE_{correct.}$), the corrected metabolizable energy ($ME_{correct.}$), the corrected net energy ($NE_{correct.}$) for pigs, and/or the corrected apparent metabolizable energy corrected to zero nitrogen retention ($AME_{n,\,correct.}$) for poultry obtained in step A4), B4), C4), F3), G3) and/or H3) above, and indicating the thus determined difference as energy deficit of the feedstuff raw material and/or feedstuff;
K2) when the feedstuff raw material and/or feedstuff has an energy deficit, calculating the amounts of at least one feedstuff raw material and/or feedstuff required to give a feed with a specific energy value, when the corrected energy value obtained in step A4), B4), C4), F3), G3) and/or H3) for the at least one feedstuff raw material and/or feedstuff is lower than the energy value which is required for said feedstuff raw material and/or feedstuff to reach the specific energy value of the feed; and
K3) supplementing the amounts of the at least one feedstuff raw material and/or feedstuff calculated in step K2) to the raw material and/or feedstuff to give a feed with a specific energy value, and/or L) adjusting the processing condition of the feedstuff raw material and/or feedstuff, including
L1) plotting the digestible energy (DE), the metabolizable energy (ME), the net energy (NE) for pigs, and/or the apparent metabolizable energy corrected to zero nitrogen retention ($AME_n$) for poultry obtained in step B1) and/or F1) and/or the corrected digestible energy ($DE_{correct.}$), the corrected metabolizable energy ($ME_{correct.}$), the corrected net energy ($NE_{correct.}$) for pigs, and/or the corrected apparent metabolizable energy corrected to zero nitrogen retention ($AME_{n,\,correct.}$) for poultry obtained in step A4), B4), C4), F3), G3) and/or H3) and/or the ratio of any of these energies to the gross energy (GE) obtained in A1), and/or G1) into the processing scale obtained in step d) above to indicate whether the feedstuff raw material and/or feedstuff is over-processed, adequately-processed or under-processed;
L2) further processing the feedstuff raw material and/or feedstuff until it is adequately-processed, if said feedstuff and/or raw feedstuff was indicated as under-processed in step L1).

The achievement of an adequate processing of the feedstuff raw material and/or feedstuff in step L2) can be checked by subjecting a sample of the under-processed feedstuff raw material and/or feedstuff to a further processing prior to subjecting the whole batch of the under-processed feedstuff raw material and/or feedstuff to a further processing, taking sub-samples of the further processed feedstuff raw material and/or feedstuff in equidistant time intervals, and subjecting said sub-samples to a computer-implemented method for the assessment of the processing influences on the energy value of a feedstuff raw material and/or feedstuff according to the present invention. This allows to determine the time period it takes to achieve an adequate processing at a specific treatment of the feedstuff raw material and/or feedstuff. The remaining batch of the feedstuff raw material and/or feedstuff is then further processed for the thus determined time period at the same treatment.

When an energy deficit was determined in step K2) it is preferred to recalculate the amounts of the individual components of the feed, which are required to achieve a specific energy value. In particular, one component with a typically low energy content is replaced by a component with a typically high energy value in order to achieve the specific energy value.

Preferably, the feed to be prepared is a mixed feed with two or more feedstuff raw material.

Said process facilitates the provision of feeds, which not only have no critical amounts of anti-nutritive factor but also have the desired amount of energy for the animal in question.

The present invention is further described by the following items:

1. Computer-implemented method for the determination of processing influences on the energy value of a feedstuff raw material and/or feedstuff, comprising the steps of
   a) subjecting a sample of a processed feedstuff raw material and/or feedstuff to
      a1) measuring at least one parameter selected from the group consisting of trypsin inhibitor activity, urease activity, protein solubility in alkali and protein dispersibility index of the sample;
      a2) determining the ratio of the reactive amount of lysine to the total amount of lysine comprising measuring the reactive amount of lysine and the total amount of lysine in the sample, followed by the formation of the ratio of the reactive amount of lysine to the total amount of lysine; and
      a3) measuring the amount of at least one amino acid selected from the group consisting of methionine, cysteine, cystine, threonine, leucine, arginine, isoleucine, valine, histidine, phenylalanine, tyrosine, tryptophan, glycine, serine, proline, alanine, aspartic acid and glutamic acid in the sample;
   b) plotting the parameters obtained in steps a1) to a3) as a function of the time points of processing of the sample in step a);
   c1) determining the area in the plot of step b), where the value of the trypsin inhibitor activity, expressed as mg of trypsin per g sample, is more than 4, the increase in the pH value in the determination of the urease activity is more than 0.35, the value of the protein solubility in alkali, expressed as the percentage of protein in the sample that is soluble in an alkaline solution, is more than 85%, and/or the value of the protein dispersibility index, expressed as the percentage of the original nitrogen content of the sample, is more than 40%, and assigning the thus obtained area as under-processed;

c2) determining the area in the plot of step b), where the value of the ratio of the reactive amount of lysine to the total amount of lysine is less than 90%, the value of the protein dispersibility index, expressed as the percentage of the original nitrogen content of the sample, is less than 15%, and/or the value of the protein solubility in alkali, expressed as the percentage of protein in the sample that is soluble in an alkaline solution, is less than 73%, and assigning the thus obtained area as over-processed;

c3) determining the area in the plot of step b), where the value of the trypsin inhibitor activity, expressed as mg of trypsin per g sample, is less than 4, the value of the protein solubility in alkali, expressed as the percentage of protein in the sample that is soluble in an alkaline solution, is between 73 and 85%, the value of the protein dispersibility index, expressed as the percentage of the original nitrogen content of the sample, is between 15 and 40% and/or the value of the ratio of the reactive amount of lysine to the total amount of lysine is at least 90%, and assigning the thus obtained area as adequately processed; and/or subtracting the areas determined in steps c1) and c2) from the plot of b) and assigning the thus obtained area as adequately processed;

d) generating a processing scale by standardizing the areas obtained in steps c1) to c3) to equal size, sorting them from over-processing to under-processing or vice versa and assigning a continuous scaling to the standardized and sorted areas;

e) inserting the values of the parameters obtained in steps a1) to a3) into a power series, and forming the mean of the values obtained from each power series, wherein said mean is designated as the processing condition indicator (PCI); and f) measuring the gross energy (GE), the digestible energy (DE), the metabolisable energy (ME), the net energy (NE) for pigs, and/or the apparent metabolizable energy corrected to zero nitrogen retention ($AME_n$) for poultry in a sample of the same feedstuff raw material and/or feedstuff as in step a).

2. Computer-implemented method according to item 1, further comprising the steps of g) expressing the digestible energy (DE), the metabolizable energy (ME), the net energy (NE) for pigs, and/or the apparent metabolizable energy corrected to zero nitrogen retention ($AME_n$) for poultry obtained in step f) as a function of the processing conditions indicator obtained in step e) in an equation and/or as a graph; and h) shifting the maximum of the at least one equation obtained in step g) and/or of the at least one graph obtained in step g) to 0.

3. Computer-implemented method according to item 1, further comprising the steps of i) forming at least one ratio of the group consisting of the digestible energy to gross energy ratio (DE/GE), the metabolisable energy to gross energy ratio (ME/GE), the net energy to gross energy ratio (NE/GE) for pigs, and/or the apparent metabolisable energy corrected to zero nitrogen retention to gross energy ratio ($AME_n$/GE) for poultry; and j) expressing the at least one ratio obtained in step i) as a function of the processing conditions indicator obtained in step e) in an equation and/or as a graph.

4. Computer-implemented method according to item 1, further comprising the steps of k) expressing the digestible energy (DE), the metabolizable energy (ME), the net energy (NE) for pigs, and/or the apparent metabolizable energy corrected to zero nitrogen retention ($AME_n$) for poultry obtained in step f) as a function of the processing conditions indicator obtained in step e) in an equation and/or as a graph; and l) setting the maximum of the at least one equation obtained in step k) and/or of the at least one graph obtained in step k) to 100%.

5. Computer-implemented method for the assessment of processing influences on the energy value of a feedstuff raw material and/or feedstuff, comprising the steps of A1) measuring the gross energy (GE) of a sample of a processed feedstuff raw material and/or feedstuff, wherein said sample is of unknown origin or of the same origin as in step a) of item 1;

A2) determining the processing conditions indicator (PCI) of the sample of step A1) in the steps of a) subjecting said sample to a1) measuring at least one parameter selected from the group consisting of trypsin inhibitor activity, urease activity, protein solubility in alkali and protein dispersibility index of the sample;

a2) determining the ratio of the reactive amount of lysine to the total amount of lysine comprising measuring the reactive amount of lysine and the total amount of lysine in the sample, followed by the formation of the ratio of the reactive amount of lysine to the total amount of lysine; and a3) measuring the amount of at least one amino acid selected from the group consisting of methionine, cysteine, cystine, threonine, leucine, arginine, isoleucine, valine, histidine, phenylalanine, tyrosine, tryptophan, glycine, serine, proline, alanine, aspartic acid and glutamic acid in the sample;

b) plotting the parameters obtained in steps a1) to a3) as a function of the time points of processing of the sample in step a);

c1) determining the area in the plot of step b), where the value of the trypsin inhibitor activity, expressed as mg of trypsin per g sample, is more than 4, the increase in the pH value in the determination of the urease activity is more than 0.35, the value of the protein solubility in alkali, expressed as the percentage of protein in the sample that is soluble in an alkaline solution, is more than 85%, and/or the value of the protein dispersibility index, expressed as the percentage of the original nitrogen content of the sample, is more than 40%, and assigning the thus obtained area as under-processed;

c2) determining the area in the plot of step b), where the value of the ratio of the reactive amount of lysine to the total amount of lysine is less than 90%, the value of the protein dispersibility index, expressed as the percentage of the original nitrogen content of the sample, is less than 15%, and/or the value of the protein solubility in alkali, expressed as the percentage of protein in the sample that is soluble in an alkaline solution, is less than 73%, and assigning the thus obtained area as over-processed;

c3) determining the area in the plot of step b), where the value of the trypsin inhibitor activity, expressed as mg of trypsin per g sample, is less than 4, the value of the protein solubility in alkali, expressed as the percentage of protein in the sample that is soluble in an alkaline solution, is between 73 and 85%, the value of the protein dispersibility index, expressed as the percentage of the original nitrogen content of the sample, is between 15 and 40% and/or the value of the ratio of the reactive amount of lysine to the total amount of lysine is at least 90%, and assigning the thus obtained area as adequately processed; and/or subtracting the areas determined in steps c1) and c2) from the plot of b) and assigning the thus obtained area as adequately processed;

d) generating a processing scale by standardizing the areas obtained in steps c1) to c3) to equal size, sorting them from over-processing to under-processing or vice versa and assigning a continuous scaling to the standardized and sorted areas;

e) inserting the values of the parameters obtained in steps a1) to a3) into a power series, and forming the mean of the values obtained from each power series, wherein said mean is designated as the processing condition indicator (PCI); and A3) inserting the processing conditions indicator (PCI) obtained in step A2) into the equation obtained in step j) according to item 3 to obtain the digestible energy to gross energy ratio (DE/GE), the metabolizable energy to gross energy ratio (ME/GE), the net energy to gross energy ratio (NE/GE) for pigs, and/or the apparent metabolizable energy corrected to zero nitrogen retention to gross energy ratio ($AME_n$/GE) for poultry and/or reading off DE/GE, ME/GE, NE/GE, and/or $AME_n$/GE from the graph obtained in step j) according to item 3 as a function of the processing conditions indicator (PCI) obtained in step A2); and A4) multiplying the gross energy (GE) obtained in step A1) with the digestible energy to gross energy ratio (DE/GE), the metabolizable energy to gross energy ratio (ME/GE), the net energy to gross energy ratio (NE/GE) for pigs, and/or the apparent metabolizable energy corrected to zero nitrogen retention to gross energy ratio ($AME_n$/GE) for poultry obtained in step A3) to give the corrected digestible energy ($DE_{correct.}$), the corrected metabolizable energy ($ME_{correct.}$), the corrected net energy ($NE_{correct.}$) for pigs and/or the corrected apparent metabolizable energy corrected to zero nitrogen retention ($AME_{n,\ correct.}$) for poultry.

6. Computer-implemented method for the assessment of the processing influences on the energy value of a feedstuff raw material and/or feedstuff, comprising the steps of B1) measuring the digestible energy (DE), the metabolizable energy (ME), the net energy (NE) for pigs, and/or the apparent metabolizable energy corrected to zero nitrogen retention ($AME_n$) for poultry of a sample of a processed feedstuff raw material and/or feedstuff, wherein said sample is of unknown origin or of the same origin as in step a) of item 1;

B2) determining the processing conditions indicator (PCI) of the sample of step B1) in the steps of a) subjecting said sample to
a1) measuring at least one parameter selected from the group consisting of trypsin inhibitor activity, urease activity, protein solubility in alkali and protein dispersibility index of the sample;

a2) determining the ratio of the reactive amount of lysine to the total amount of lysine comprising measuring of the reactive amount of lysine and the total amount of lysine in the sample, followed by the formation of the ratio of the reactive amount of lysine to the total amount of lysine; and a3) measuring the amount of at least one amino acid selected from the group consisting of methionine, cysteine, cystine, threonine, leucine, arginine, isoleucine, valine, histidine, phenylalanine, tyrosine, tryptophan, glycine, serine, proline, alanine, aspartic acid and glutamic acid in the sample;

b) plotting the parameters obtained in steps a1) to a3) as a function of the time points of processing of the sample in step a);

c1) determining the area in the plot of step b), where the value of the trypsin inhibitor activity, expressed as mg of trypsin per g sample, is more than 4, the increase in the pH value in the determination of the urease activity is more than 0.35, the value of the protein solubility in alkali, expressed as the percentage of protein in the sample that is soluble in an alkaline solution, is more than 85%, and/or the value of the protein dispersibility index, expressed as the percentage of the original nitrogen content of the sample, is more than 40%, and assigning the thus obtained area as under-processed;

c2) determining the area in the plot of step b), where the value of the ratio of the reactive amount of lysine to the total amount of lysine is less than 90%, the value of the protein dispersibility index, expressed as the percentage of the original nitrogen content of the sample, is less than 15%, and/or the value of the protein solubility in alkali, expressed as the percentage of protein in the sample that is soluble in an alkaline solution, is less than 73%, and assigning the thus obtained area as over-processed;

c3) determining the area in the plot of step b), where the value of the trypsin inhibitor activity, expressed as mg of trypsin per g sample, is less than 4, the value of the protein solubility in alkali, expressed as the percentage of protein in the sample that is soluble in an alkaline solution, is between 73 and 85%, the value of the protein dispersibility index, expressed as the percentage of the original nitrogen content of the sample, is between 15 and 40% and/or the value of the ratio of the reactive amount of lysine to the total amount of lysine is at least 90%, and assigning the thus obtained area as adequately processed; and/or subtracting the areas determined in steps c1) and c2) from the plot of b) and assigning the thus obtained area as adequately processed;
d) generating a processing scale by standardizing the areas obtained in steps c1) to c3) to equal size, sorting them from over-processing to under-processing or vice versa and assigning a continuous scaling to the standardized and sorted areas;
e) inserting the values of the parameters obtained in steps a1) to a3) into a power series, and forming the mean of the values obtained from each power series, wherein said mean is designated as the processing condition indicator (PCI); and B3) inserting the processing conditions indicator (PCI) obtained in step B2) into the equation obtained in step h) according to item 2 to obtain a correction factor and/or reading off the correction factor from the graph obtained in step h) according to item 2 as a function of the processing conditions indicator (PCI) obtained in step B2); and B4) subtracting the correction factor obtained in step B3) from the digestible energy (DE), the metabolizable energy (ME), the net energy (NE) for pigs, and/or the apparent metabolizable energy corrected to zero nitrogen retention ($AME_n$) for poultry obtained in step B1) to give the corrected digestible energy ($DE_{correct.}$), the corrected metabolizable energy ($ME_{correct.}$), the corrected net energy ($NE_{correct.}$) for pigs, and/or the corrected apparent metabolizable energy corrected to zero nitrogen retention ($AME_{n,\ correct.}$) for poultry.

7. Computer-implemented method for the assessment of processing influences on the energy value of a feedstuff raw material and/or feedstuff, comprising the steps of C1) measuring the digestible energy (DE), the metabolizable energy (ME), the net energy (NE) for pigs, and/or the apparent metabolizable energy corrected to zero nitrogen retention ($AME_n$) for poultry of a sample of a processed feedstuff raw material and/or feedstuff, wherein said sample is of unknown origin or of the same origin as in step a) of item 1;

C2) determining the processing conditions indicator (PCI) of the sample of step C1) in the steps of
a) subjecting said sample to
a1) measuring at least one parameter selected from the group consisting of trypsin inhibitor activity, urease activity, protein solubility in alkali and protein dispersibility index of the sample;
a2) determining the ratio of the reactive amount of lysine to the total amount of lysine comprising measuring of the reactive amount of lysine and the total amount of lysine in the sample, followed by the formation of the ratio of the reactive amount of lysine to the total amount of lysine; and
a3) measuring the amount of at least one amino acid selected from the group consisting of methionine, cysteine, cystine, threonine, leucine, arginine, isoleucine, valine, histidine, phenylalanine, tyrosine, tryptophan, glycine, serine, proline, alanine, aspartic acid and glutamic acid in the sample;
b) plotting the parameters obtained in steps a1) to a3) as a function of the time points of processing of the sample in step a);
c1) determining the area in the plot of step b), where the value of the trypsin inhibitor activity, expressed as mg of trypsin per g sample, is more than 4, the increase in the pH value in the determination of the urease activity is more than 0.35, the value of the protein solubility in alkali, expressed as the percentage of protein in the sample that is soluble in an alkaline solution, is more than 85%, and/or the value of the protein dispersibility index, expressed as the percentage of the original nitrogen content of the sample, is more than 40%, and assigning the thus obtained area as under-processed;
c2) determining the area in the plot of step b), where the value of the ratio of the reactive amount of lysine to the total amount of lysine is less than 90%, the value of the protein dispersibility index, expressed as the percentage of the original nitrogen content of the sample, is less than 15%, and/or the value of the protein solubility in alkali, expressed as the percentage of protein in the sample that is soluble in an alkaline solution, is less than 73%, and assigning the thus obtained area as over-processed;
c3) determining the area in the plot of step b), where the value of the trypsin inhibitor activity, expressed as mg of trypsin per g sample, is less than 4, the value of the protein solubility in alkali, expressed as the percentage of protein in the sample that is soluble in an alkaline solution, is between 73 and 85%, the value of the protein dispersibility index, expressed as the percentage of the original nitrogen content of the sample, is between 15 and 40% and/or the value of the ratio of the reactive amount of lysine to the total amount of lysine is at least 90%, and assigning the thus obtained area as adequately processed;
and/or
subtracting the areas determined in steps c1) and c2) from the plot of b) and assigning the thus obtained area as adequately processed;
d) generating a processing scale by standardizing the areas obtained in steps c1) to c3) to equal size, sorting them from over-processing to under-processing or vice versa and assigning a continuous scaling to the standardized and sorted areas;
e) inserting the values of the parameters obtained in steps a1) to a3) into a power series, and forming the mean of the values obtained from each power series, wherein said mean is designated as the processing condition indicator (PCI); and C3) inserting the processing conditions indicator (PCI) obtained in step C2) into the equation obtained in step l) according to item 4 and/or reading off the function value from the graph obtained in step l) according to item 4 as a function of the processing conditions indicator (PCI) obtained in step C2) to give the relative corrected digestible energy ($DE_{correct.,\ rel.}$), the relative corrected metabolizable energy ($ME_{correct.,\ rel.}$), the relative corrected net energy ($NE_{correct.,\ rel.}$) for pigs, and/or the relative corrected apparent metabolizable energy corrected to zero nitrogen retention ($AME_{n,\ correct.,\ rel.}$) for poultry; and C4) multiplying the digestible energy (DE), the metabolizable energy (ME), the net energy (NE) for pigs, and/or the apparent metabolizable energy corrected to zero nitrogen retention ($AME_n$) for poultry obtained in step C1) with the relative corrected digestible energy ($DE_{correct., rel.}$), the relative corrected metabolizable energy ($ME_{correct., rel.}$), the relative corrected net energy ($NE_{correct., rel.}$) for pigs, and/or the relative corrected apparent metabolizable energy corrected to zero nitrogen retention ($AME_{n, correct., rel.}$) for poultry obtained in step C3) to give the corrected digestible energy ($DE_{correct.}$), the corrected metabolizable energy ($ME_{correct.}$), the corrected net energy ($NE_{correct.}$) for pigs, and/or the corrected apparent metabolizable energy corrected to zero nitrogen retention ($AME_{n, correct.}$) for poultry.

8. Computer-implemented method for the assessment of the processing influences on the energy value of a feedstuff raw material and/or feedstuff, comprising the steps of
D1) recording a near infrared spectrum of a sample of the same feedstuff raw material and/or feedstuff as in step a) of item 1;
D2) matching the absorption intensities at the respective wavelengths or wavenumbers in the near infrared spectrum obtained in step D1) with the corresponding parameters and their values determined in steps a1) to a3) of item 1; and
D3) plotting the matching of step D2) as a calibration graph and/or expressing the parameters determined in steps a1) to a3) in a calibration equation as a function of the absorption intensities at the respective wavelengths or wavenumbers matched in step D2).

9. Computer-implemented method according to any of items 1 to 7, comprising the steps of
D1) recording a near infrared spectrum of a sample of the same feedstuff raw material and/or feedstuff as in step a) of item 1;
D2) matching the absorption intensities at the respective wavelengths or wavenumbers in the near infrared spectrum obtained in step D1) with the corresponding parameters and their values determined in steps a1) to a3) of item 1; and
D3) plotting the matching of step D2) as a calibration graph and/or expressing the parameters determined in steps a1) to a3) in a calibration equation as a function of the absorption intensities at the respective wavelengths or wavenumbers matched in step D2).

10. Computer-implemented method according to item 8 or 9, further comprising the steps of
D4) matching the absorption intensities at the respective wavelengths or wavenumbers in the near infrared spectrum of a sample obtained in step D2) of item 9 with the processing conditions indicator obtained for the same sample in step e) of item 1; and
D5) plotting the matching of step D4) as a calibration graph and/or expressing the processing conditions indicator in a calibration equation as a function of the absorption intensities at the respective wavelengths or wavenumbers matched in step D4).

11. Computer-implemented method according to any of items 8 to 10, further comprising the steps of
E1) recording a near infrared spectrum of a sample of a processed feedstuff raw material and/or feedstuff, wherein said sample is of unknown origin or of the same origin as in step a) of item 1;
E2) reading off the values of at least one of the parameters of steps a1) to a3) matching to the absorptions in the near infrared spectrum obtained in step E1) from the calibration graph of step D3), and/or inserting the absorption intensities at the respective wavelengths or wavenumbers in the near infrared spectrum obtained in step E1) into the calibration equation of step D3) to obtain the values for the parameters of steps a1) to a3);
E3) inserting the values for the parameters obtained in step E2) into power series and forming the mean of the values obtained from each power series, wherein said mean is designated as the processing conditions indicator (PCI); and/or
E4) reading off the processing conditions indicator from the calibration graph of step D5) and/or inserting the absorption intensities at the respective wavelengths or wavenumbers into the calibration equation of step D5) to obtain the processing conditions indicator (PCI).

12. Computer-implemented method according to item 11, further comprising the steps of
F1) measuring the digestible energy (DE), the metabolizable energy (ME), the net energy (NE) for pigs, and/or the apparent metabolizable energy corrected to zero nitrogen retention ($AME_n$) for poultry in a sample of the same feedstuff raw material and/or feedstuff as in step E1);
F2) inserting the processing conditions indicator obtained in step E3) and/or E4) into the equation for the digestible energy (DE), the metabolizable energy (ME), the net energy (NE) for pigs, and/or the apparent metabolizable energy corrected to zero nitrogen retention ($AME_n$) for poultry obtained in step h) of item 2 to obtain a correction factor and/or reading off the correction factor from the corresponding graph obtained in step h) of item 2 as a function of the processing conditions indicator; and
F3) subtracting the correction factor obtained in step F2) from the digestible energy (DE), the metabolizable energy (ME), the net energy for pigs (NE), and/or the apparent metabolizable energy corrected to zero nitrogen retention for poultry ($AME_n$) obtained in step F1) to give the corrected digestible energy ($DE_{correct.}$), the corrected metabolizable energy ($ME_{correct.}$), the corrected net energy ($NE_{correct.}$) for pigs, and/or the corrected apparent metabolizable energy corrected to zero nitrogen retention ($AME_{n, correct.}$) for poultry.

13. Computer-implemented method according to item 11, further comprising the steps of
G1) measuring the gross energy (GE) in a sample of the same feedstuff raw material and/or feedstuff as in step E1);
G2) inserting the processing conditions indicator obtained in step E3) and/or E4) into the equation obtained in step j) of item 3 to obtain the digestible energy to gross energy ratio (DE/GE), the metabolizable energy to gross energy ratio (ME/GE), the net energy to gross energy ratio (NE/GE) for pigs, and/or the apparent metabolizable energy corrected to zero nitrogen retention to gross energy ratio ($AME_n$/GE) for poultry and/or reading off any of said ratios as a function of the processing conditions indicator (PCI) from the graph obtained in step j) of item 3; and
G3) multiplying the gross energy (GE) obtained in step G1) with the digestible energy to gross energy ratio (DE/GE), the metabolizable energy to gross energy ratio (ME/GE), the net energy to gross energy ratio (NE/GE) for pigs, and/or the apparent metabolizable energy corrected to zero nitrogen retention to gross energy ratio ($AME_n$/GE) for poultry obtained in step G2) to give the corrected digestible energy ($DE_{correct.}$), the corrected metabolizable energy ($ME_{correct.}$), the corrected net energy ($NE_{correct.}$) for pigs, and/or the corrected apparent metabolizable energy corrected to zero nitrogen retention ($AME_{n, correct.}$) for poultry.

14. Computer-implemented method according to item 11, further comprising the step of
  H1) measuring the digestible energy (DE), the metabolizable (ME), the net energy (NE) for pigs, and/or the apparent metabolizable energy corrected to zero nitrogen retention ($AME_n$) for poultry in a sample of the same feedstuff raw material and/or feedstuff as in step E1);
  H2) inserting the processing conditions indicator (PCI) obtained in step E3) and/or E4) into the equation obtained in step l) according to item 4 in order to obtain the relative corrected digestible energy ($DE_{correct.,rel.}$), the relative corrected metabolizable energy ($ME_{correct. rel.}$), the relative corrected net energy ($NE_{correct. rel.}$) for pigs and/or the relative corrected apparent metabolizable energy corrected to zero nitrogen retention ($AME_{n, correct. rel.}$) for poultry of the sample of step E1) and/or reading off any of said energy values as a function of the processing conditions indicator (PCI) obtained in step E3) and/or E4) from the graph obtained in step l) according to item 4; and
  H3) multiplying the digestible energy (DE), the metabolizable energy (ME), the net energy (NE) for pigs, and/or the apparent metabolizable energy corrected to zero nitrogen retention ($AME_n$) for poultry obtained in step H1) with the relative corrected digestible energy ($DE_{correct,rel.}$), the relative corrected metabolizable energy ($ME_{correct,rel.}$), the relative corrected net energy ($NE_{correct.,rel.}$) for pigs and/or the relative corrected apparent metabolizable energy corrected to zero nitrogen retention ($AME_{n, correct.,rel.}$) for poultry obtained in step H2) to give the corrected digestible energy ($DE_{correct.}$), the corrected metabolizable energy ($ME_{correct.}$), the corrected net energy ($NE_{correct.}$) for pigs and/or the corrected apparent metabolizable energy corrected to zero nitrogen retention ($AME_{n, correct.}$) for poultry.

15. Computer-implemented method according to any of items 11 to 14, further comprising the steps of
  I1) determining the energy deficit in the feedstuff raw material and/or feedstuff by determining the difference between the digestible energy (DE), the metabolizable energy (ME), the net energy (NE) for pigs, and/or the apparent metabolizable energy corrected to zero nitrogen retention ($AME_n$) for poultry obtained in step B1) and/or F1) and the corrected digestible energy ($DE_{correct.}$), the corrected metabolizable energy ($ME_{correct.}$), the corrected net energy ($NE_{correct.}$) for pigs, and/or the corrected apparent metabolizable energy corrected to zero nitrogen retention ($AME_{n, correct.}$) for poultry obtained in step A4), B4), C4), F3), G3) and/or H3); and
  I2) when an energy deficit was determined in step 11), calculating the amounts of at least one feedstuff raw material and/or feedstuff required to give a feed with a specific energy value.

16. Computer-implemented method according to any of items 5 to 15, further comprising the step of
  J) plotting the digestible energy (DE), the metabolizable energy (ME), the net energy (NE) for pigs, and/or the apparent metabolizable energy corrected to zero nitrogen retention ($AME_n$) for poultry obtained in step B1) and/or F1) and/or the corrected digestible energy ($DE_{correct.}$), the corrected metabolizable energy ($ME_{correct.}$), the corrected net energy ($NE_{correct.}$) for pigs, and/or the corrected apparent metabolizable energy corrected to zero nitrogen retention ($AME_{n, correct.}$) for poultry obtained in step A4), B4), C4), F3), G3) and/or H3) and/or the ratio of any of these energies to the gross energy (GE) obtained in step A1), and/or step G1) into the processing scale obtained in step d) of item 1, 5, 6 and/or 7 to indicate whether the feedstuff raw material and/or feedstuff is over-processed, adequately-processed or under-processed.

17. Computer-implemented method according to any of items 1 to 16, wherein
  i) the equation and/or graph obtained in step j) of item 3 is/are stored on a computer or a cloud,
  ii) the equation and/or graph obtained in step h) of item 2 is/are stored on a computer or a cloud,
  iii) the equation and/or graph obtained in step l) of item 4 is/are stored on a computer or a cloud,
  iv) the calibration graph and/or calibration equation obtained in step D3) of item 6 and the equation and/or graph obtained in step h) of item 2 are stored on a computer or a cloud,
  v) the calibration graph and/or calibration equation obtained in step D5) of item 7 and the equation and/or graph obtained in step j) of item 3 are stored on a computer of a cloud, and/or
  vi) the processing scale obtained in step d) of item 1 is stored on a computer and/or a cloud.

18. Computer-implemented process for the preparation of a feed comprising the steps
  K) adjusting the energy value of the feedstuff, including
    K1) determining the difference between the digestible energy (DE), the metabolizable energy (ME), the net energy (NE) for pigs, and/or the apparent metabolizable energy corrected to zero nitrogen retention ($AME_n$) for poultry obtained in step B1) of item 6, and/or F1) of item 12 and the corrected digestible energy ($DE_{correct.}$), the corrected metabolizable energy ($ME_{correct.}$), the corrected net energy ($NE_{correct.}$) for pigs, and/or the corrected apparent metabolizable energy corrected to zero nitrogen retention ($AME_{n, correct.}$) for poultry obtained in step A4) of item 5, B4) of item 6, C4) of claim 7, F3) of item 12, G3) of item 13, and/or H3) of item 14, and indicating the thus determined difference as energy deficit of the feedstuff raw material and/or feedstuff;
    K2) when the feedstuff raw material and/or feedstuff has an energy deficit, calculating the amounts of at least one feedstuff raw material and/or feedstuff required to give a feed with a specific energy value, when the corrected energy value obtained in step A4), B4), C4), F3), G3), and/or H3) for the at least one feedstuff raw material and/or feedstuff is lower than the energy value which is required for said feedstuff raw material and/or feedstuff to reach the specific energy value of the feed; and
    K3) supplementing the amounts of the at least one feedstuff raw material and/or feedstuff calculated in step K2) to the raw material and/or feedstuff to give a feed with a specific energy value, and/or
L) adjusting the processing condition of the feedstuff raw material and/or feedstuff, including
  L1) plotting the digestible energy (DE), the metabolizable energy (ME), the net energy (NE) for pigs, and/or the apparent metabolizable energy corrected to zero nitrogen retention ($AME_n$) for poultry obtained in step B1) and/or F1) and/or the corrected digestible energy ($DE_{correct.}$), the corrected metabolizable energy ($ME_{correct.}$), the corrected net energy ($NE_{correct.}$) for pigs, and/or the corrected apparent metabolizable energy corrected to zero nitrogen retention ($AME_{n,\ correct.}$) for poultry obtained in step A4), B4), C4), F3), G3), and/or H3) and/or the ratio of any of these energies to the gross energy (GE) obtained in A1), and/or G1) into the processing scale obtained in step d) of item 1 to indicate whether the feedstuff raw material and/or feedstuff is over-processed, adequately-processed or under-processed;
  L2) further processing the feedstuff raw material and/or feedstuff until it is adequately-processed, if said feedstuff and/or raw feedstuff was indicated as under-processed in step L1).

FIGURES

Figure 2:
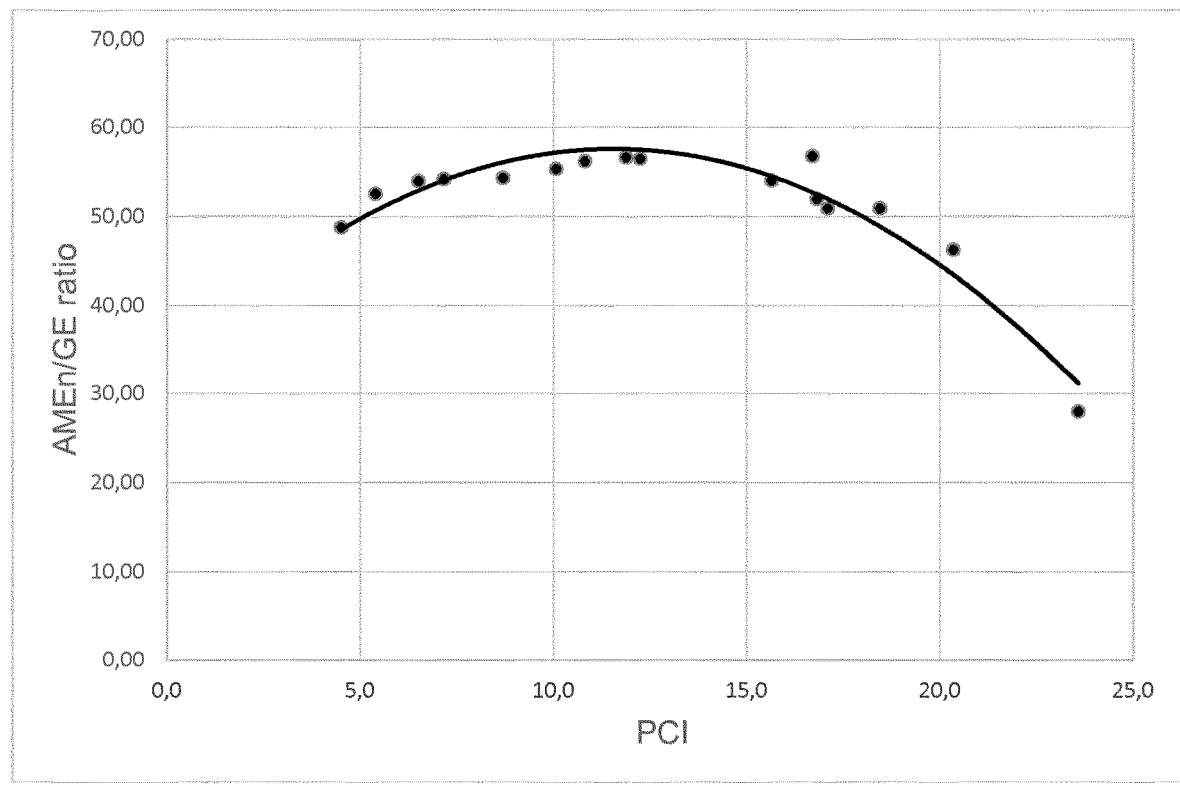
Figure 3:
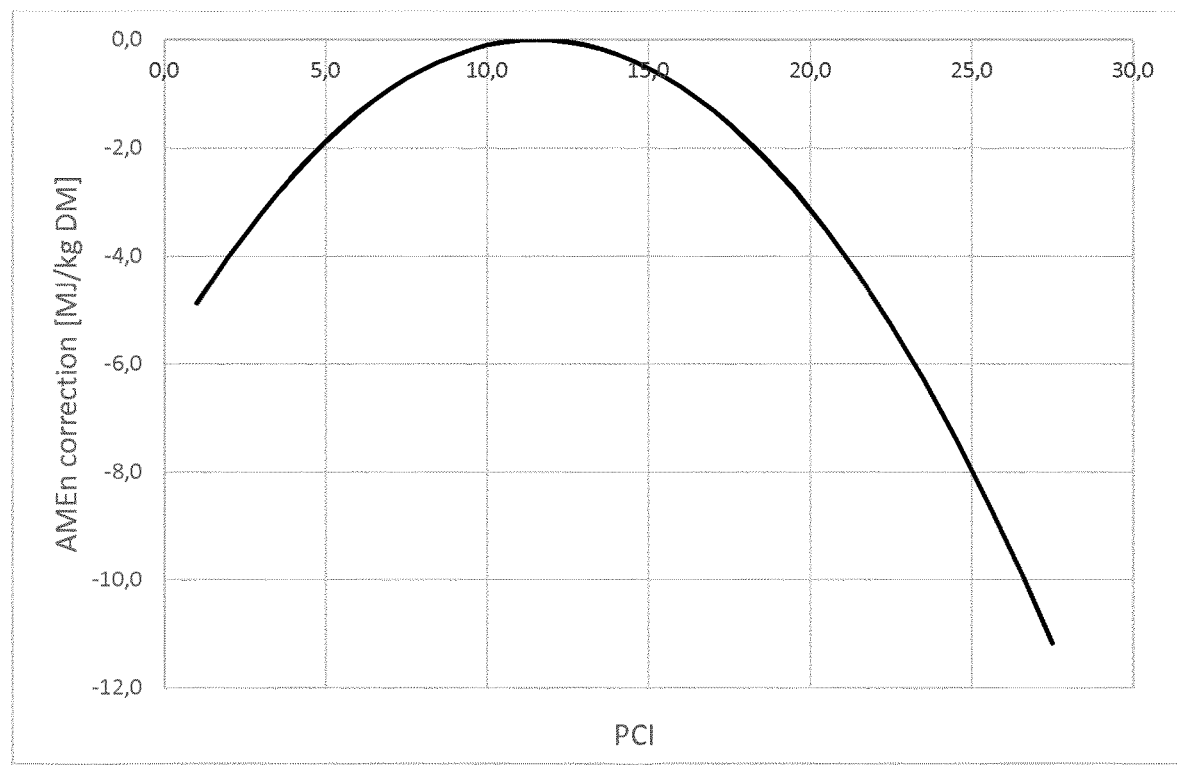

FIG. 1 shows the apparent metabolisable energy corrected to zero nitrogen retention ($AME_n$) of processed full-fat soybeans for poultry as a function of the processing conditions indicator. In this figure the diamonds correspond to the individual values of the $AME_n$ as a function of of the PCIs for the respective processed full-fat soybeans, and the drawn line represents the graph ($AME_n = -0.0439 \times PCI^2 + 1.0139 \times PCI + 7.9463$) with $R^2 = 0.9252$ FIG. 2 shows the ratio of the apparent metabolisable energy corrected to zero nitrogen retention for poultry to gross energy ($AME_n/GE$) of processed full-fat soybeans as a function of the processing conditions indicator. In this figure the diamonds correspond to the individual values of the $AME_n$ as a function of the PCIs for the respective processed full-fat soybeans, and the drawn line represents the graph ($AME_n/GE = -0.183 \times PCI^2 + 4.2295 \times PCI + 33.148$) with $R^2 = 0.9252$ FIG. 3 shows the graph of the ($AME_{n,\ correct.}$) of processed full-fat soybeans for poultry as a function of the processing conditions indicator ($AME_{n,\ correct.} = -0.0439 \times PCI^2 + 1.0139 \times PCI - 5.8542$)

Figure 4:
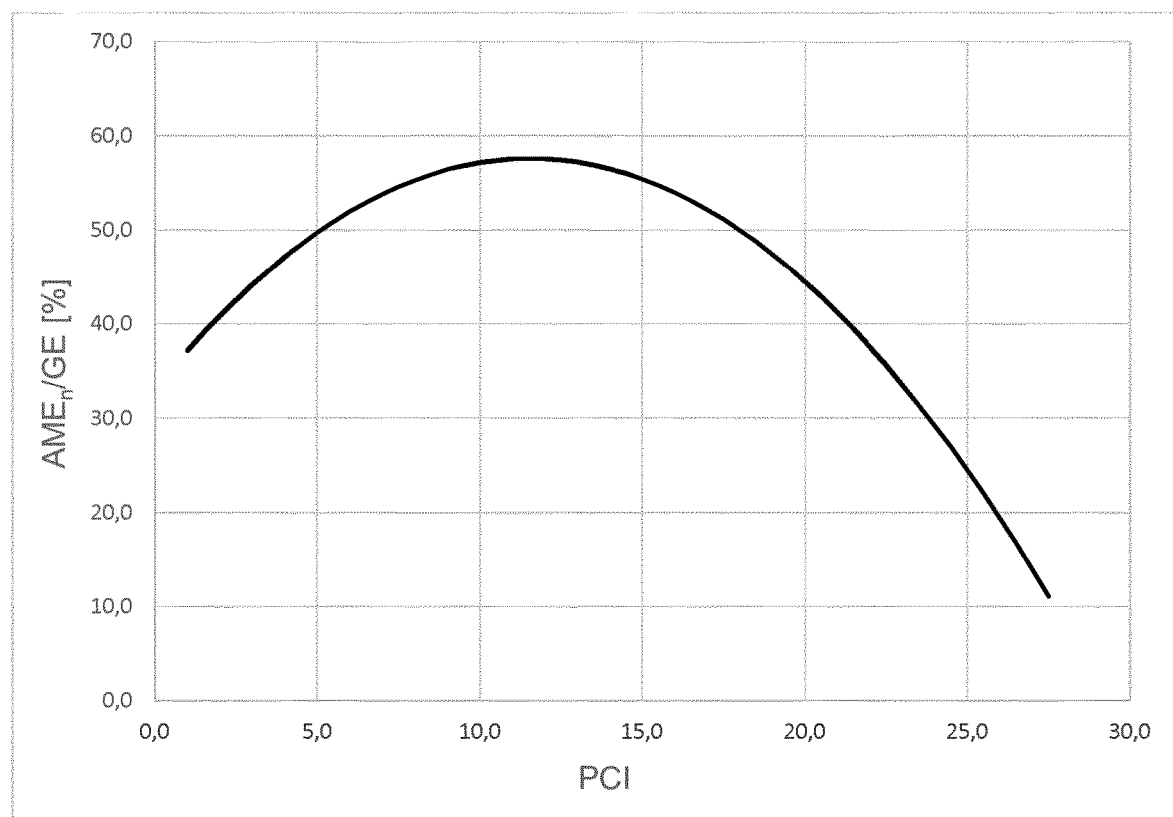
Figure 5:
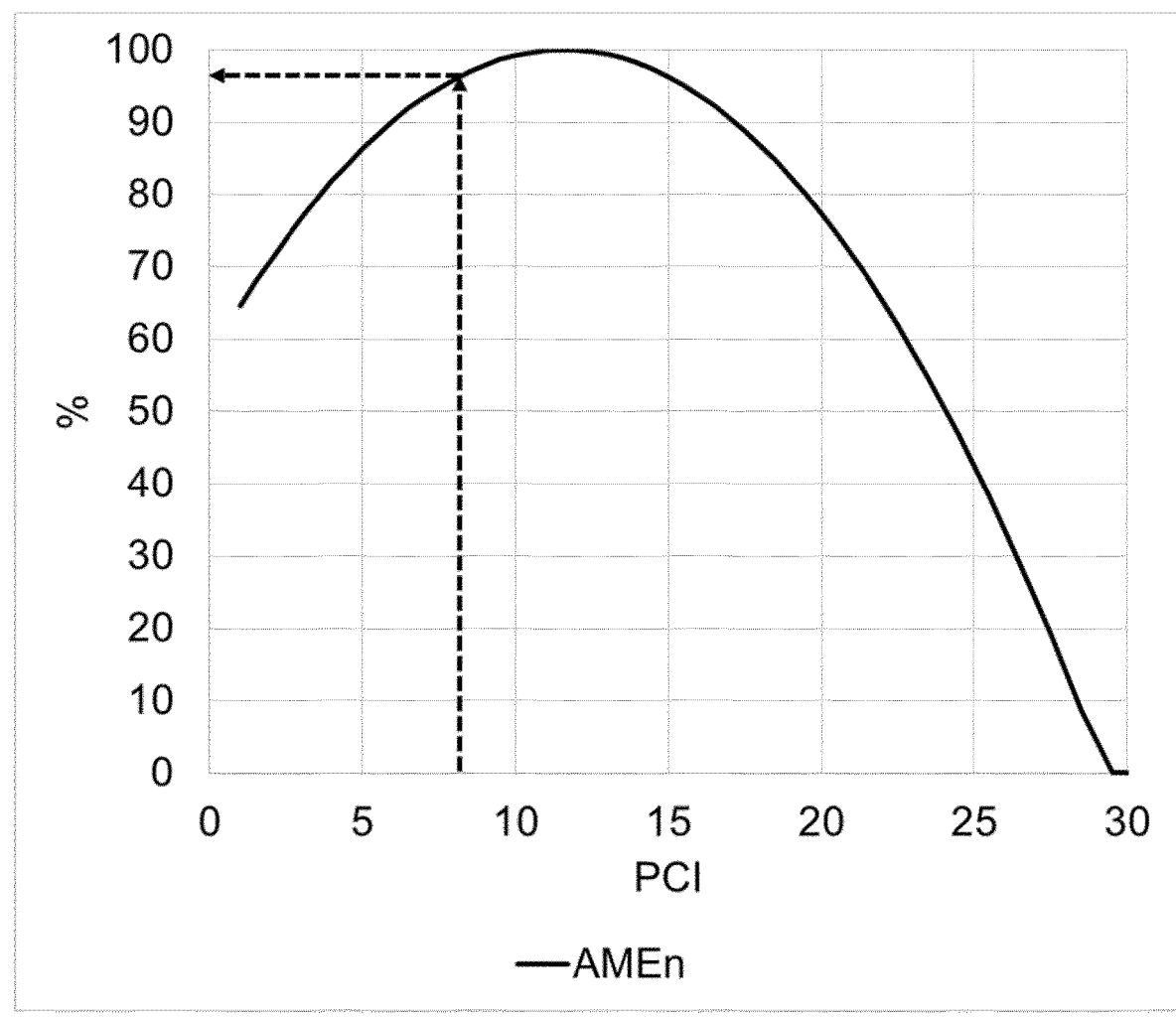

FIG. 4 shows the graph of the ratio of the ($AME_{n,\ correct.}$) to gross energy ($AME_{n,\ correct.}/GE$) as a function of the processing conditions indicator FIG. 5 shows the graph of the of the $AME_n$ of full-fat soy bean as a function of the processing conditions indicator in a relative scale.

Figure 6:
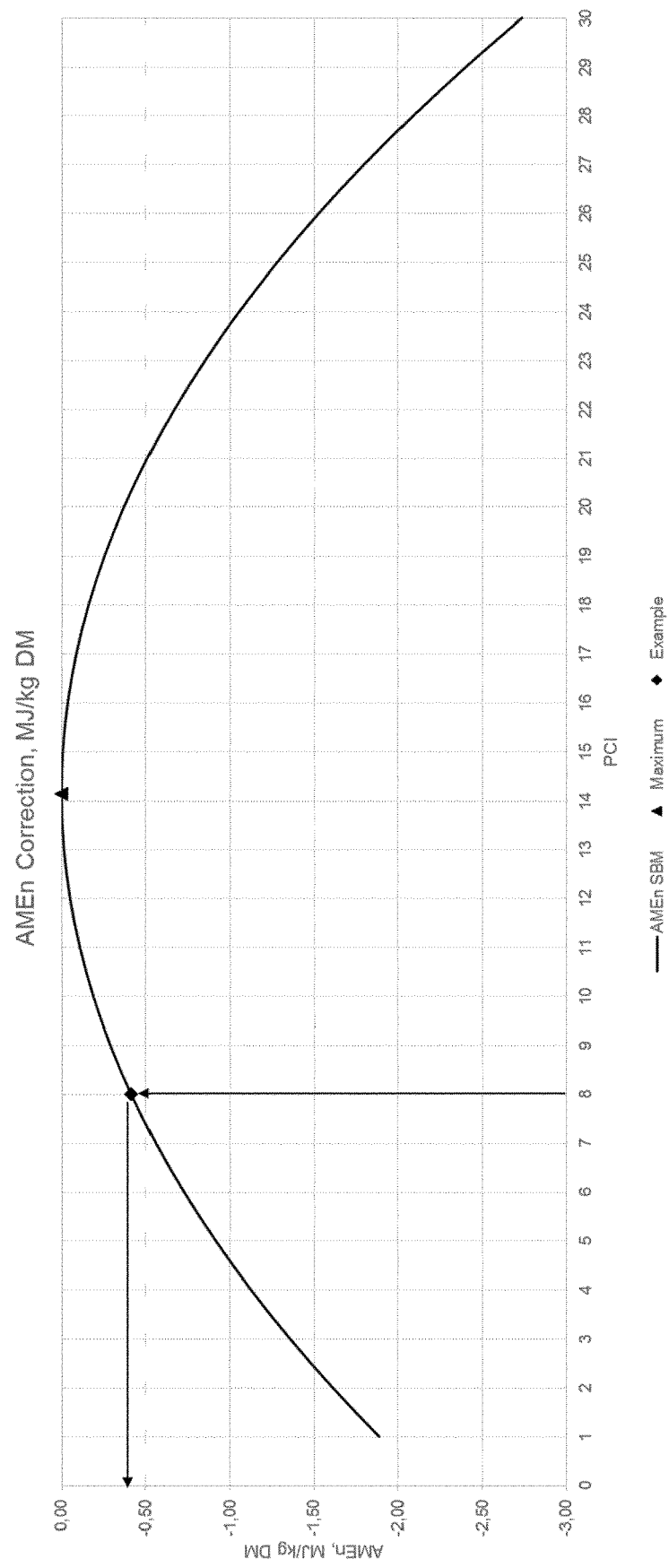

FIG. 6 shows the graph of the corrected $AME_n$ as a function of the processing conditions indicator. The triangle indicates the maximum of the corrected $AME_n$. The diamond indicates the factor, by which the $AME_n$ of the individual sample must be corrected.

EXAMPLE

I. Processing of Full-Fat Soy Bean Meal

Full-fat soy bean (FFBS) meal manufactured from a single batch was used to determine the effect of different heat treatment procedures on the energy value of a feedstuff raw material and/or feedstuff in poultry. Raw FFSB (K0) were subjected to a short time processing using wet heat at 80° C. for 1 minute (K1) or a long time processing at 100° C. for 6 minutes (K2) or at 100° C. for 16 minutes (K3), followed by further expanding at 115° C. for 15 seconds (K1/K2/K3-115) or at 125° C. for 15 seconds (K1/K2/K3-125) using an KAHL extruder OEE 15.2 from Amandus Kahl GmbH & Co. KG, Hamburg, Germany. Subsamples of K3-125 were further subjected to a heat treatment in an autoclave at 110° C. for 15 minutes (Z1), 30 minutes (Z2), 45 minutes (Z3), 60 minutes (Z4), 120 minutes (Z5), 180 minutes (Z6), 240 minutes (Z7), 300 minutes (Z8) or 360 minutes (Z9). Coming from the expander the processed FFSB are transferred at a temperature of approximately 90° C. for 20 seconds to a dryer, where the FFSB are dried for 5 minutes with a temperature gradient from 85° C. to 40° C. After the drying stage the FFSB are allowed to cool to a temperature of 20° C. for 5 minutes.

II. Feeding Trials

Feeding trials were performed for determining the apparent metabolizable energy corrected to zero nitrogen retention ($AME_n$) for poultry.

The feeding trials were approved by the Massey University Animal Ethics Committee and complied with the New Zealand Code of Practice for the Care and Use of Animals for Scientific Purposes.

Dietary Treatments

The apparent metabolizable energy corrected to zero nitrogen retention ($AME_n$) for poultry was determined by the difference method. In this method, a maize-soy basal diet was formulated (table 3) and 16 test diets, each containing different soybean full-fat samples, were formulated by replacing (w/w) 30% of the basal diet with soybean full-fat Thus, a total of 17 diets was assayed (table 4).

TABLE 3

Percentage composition of the basal diet used in the $AME_n$ assay.

| Ingredient | Percentage |
| --- | --- |
| maize | 60.78 |
| soybean meal | 35.18 |
| dicalcium phosphate | 2.17 |
| limestone | 0.78 |
| salt | 0.20 |
| sodium bicarbonate | 0.23 |
| trace mineral premix[1] | 0.25 |
| vitamin premix[1] | 0.05 |

[1]Supplied per kilogram of diet: 100 mg antioxidant, 0.2 mg biotin, 12.8 mg calcium pantothenate, 60 µg cholecalciferol, 0.017 mg cyanocobalmin, 5.5 mg folic acid, 4 mg menadione, 35 mg niacin, 10 mg pyridoxine, 3.33 mg trans-retinol. 12 mg riboflavin, 3.0 g thiamine, 60 mg dl-alpha-tocopheryl acetate, 638 mg choline chloride, 0.3 mg Co, 3.0 mg Cu, 25 mg Fe, 1 mg I, 125 mg Mn, 0.5 mg Mo, 200 µg Se, 60 mg Zn.

[1]Supplied per kilogram of diet: 100 mg antioxidant, 0.2 mg biotin, 12.8 mg calcium pantothenate, 60 µg cholecalciferol, 0.017 mg cyanocobalmin, 5.5 mg folic acid, 4 mg menadione, 35 mg niacin, 10 mg pyridoxine, 3.33 mg trans-retinol, 12 mg riboflavin, 3.0 g thiamine, 60 mg dl-alpha-tocopheryl acetate, 638 mg choline chloride, 0.3 mg Co, 3.0 mg Cu, 25 mg Fe, 1 mg 1, 125 mg Mn, 0.5 mg Mo, 200 µg Se, 60 mg Zn.

The diet codes for the 17 dietary treatments were as follows:

Diets A to P 70:30 mixture of Diet Q and full fat soybean meal (total of 16 diets), wherein the full fat soybean meal was processed as indicated above in section I Diet Q basal diet (maize-soy); see table 3 for composition

TABLE 4

Details on the dietary treatments, including the processing of the FFSB meal contained therein.

| Diet | Code | Processing of FFSB (full fat soybean) meal |
|------|------|---------------------------------------------|
| A | K0 | raw FFSB |
| B | K1-115 | wet heating at 80° C. for 1 min., followed by expanding at 115° C. for 15 sec. |
| C | K1-125 | wet heating at 80° C. for 1 min., followed by expanding at 125° C. for 15 sec. |
| D | K2-115 | wet heating at 100° C. for 1 min., followed by expanding at 115° C. for 15 sec. |
| E | K2-125 | wet heating at 100° C. for 1 min., followed by expanding at 125° C. for 15 sec. |
| F | K3-115 | wet heating at 100° C. for 16 min., followed by expanding at 115° C. for 15 sec. |
| G | K3-125 | wet heating at 100° C. for 16 min., followed by expanding at 125° C. for 15 sec. |
| H | Z1 | as K3-125, followed by heat treatment in an autoclave at 110° C. for 15 min. |
| I | Z2 | as K3-125, followed by heat treatment in an autoclave at 110° C. for 30 min. |
| J | Z3 | as K3-125, followed by heat treatment in an autoclave at 110° C. for 45 min. |
| K | Z4 | as K3-125, followed by heat treatment in an autoclave at 110° C. for 60 min. |
| L | Z5 | as K3-125, followed by heat treatment in an autoclave at 110° C. for 120 min. |
| M | Z6 | as K3-125, followed by heat treatment in an autoclave at 110° C. for 180 min. |
| N | Z7 | as K3-125, followed by heat treatment in an autoclave at 110° C. for 240 min. |
| O | Z8 | as K3-125, followed by heat treatment in an autoclave at 110° C. for 300 min. |
| P | Z9 | as K3-125, followed by heat treatment in an autoclave at 110° C. for 360 min. |
| Q | — | — |

Birds and Housing

Day-old male broilers (Ross 308), received from a commercial hatchery, were raised in floor pens and fed a commercial broiler starter diets (230 g/kg crude protein) until day 15. On day 15, 612 birds of uniform body weight were selected and randomly assigned to 102 cages (6 birds per cage) and six replicate cages were randomly assigned to each of the 17 assay diets.

The temperature was maintained at 31° C. on day 1 and then gradually reduced to 24° C. by day 22. The birds received 20-hours of fluorescent illumination and were allowed free access to the diets and water.

Measurements

The $AME_n$ assay was conducted by the classical total excreta collection method. The diets, in mash form, were fed for 10 days, with the first 6 days serving as an adaptation period. During the last 4 days, feed intake was monitored, and the excreta were collected daily, weighed and pooled within a cage. Pooled excreta were mixed well in a blender and, representative samples were obtained and freeze-dried. Dried excreta samples were ground to pass through a 0.5 mm sieve and stored in airtight plastic containers at −4° C. for laboratory analyses. The dry matter (DM), gross energy (GE)

Chemical Analysis

All analyses were conducted in an ISO 17025 (2005) accredited laboratory (Nutrition Laboratory, Massey University). Dry matter content was determined in a convection oven at 105° C. (AOAC 930.15; AOAC 925.10). Gross energy was determined using an adiabatic bomb calorimeter (Gallenkamp Autobomb, UK) standardized with benzoid acid.

Calculations

The AME values of full fat soybean (FFSB) samples were calculated using the following formulae:

$$AME_{diet}(MJ/kg) = \frac{(\text{feed intake} \times GE_{diet}) - (\text{excreta output} \times GE_{excreta})}{\text{total feed intake}}$$

$$AME_{FFSB}(MJ/kg) = \frac{AME \text{ of } FFSB \text{ diet} - (AME \text{ of basal diet} \times 0.70)}{0.30}$$

Correction for zero nitrogen retention were made using a factor of 36.54 kJ per gram N retained in the body. Applying the thus obtained correction factor on the AME values gives the $AME_n$ values of FFSB.

Statistical Analysis

The data were subjected to ANOVA using the General Linear Models procedure of SAS (2004). Significant differences were considered at P<0.05. When a significant F-test was detected, means were separated using the least significant difference test.

Results

Table 5 summarizes the results of the feeding trials and lists the AME, N retention, $AME_n$ and the $AME_n$ to GE ratio for poultry of diets containing 30% different processed FFSB.

The statistical probabilities identified relate to combined analysis of all processings. Least significant differences (P<0.05) values are provided to enable separation of significance between processings.

III. Method According to the Present Invention

The processing conditions indicator (PCI), and the apparent metabolisable energy corrected to zero nitrogen retention for poultry ($AME_n$) of full-fat soybeans (FFSB) in the different processed FFSB were determined using the method according to the present invention. Table 5 gives the PCI for each of the diets with the different processed FFSB.

TABLE 5

Summary of the different processed FFSB, the PCI and the determined AME and AMEn as well as the AME to GE and the AMEn to GE ratios.

| Diet | Code | AME FFSB [MJ/kg DM] | N retention [% of intake] | $AME_n$ FFSB [MJ/kg DM] | $AME_n$/GE [%] | PCI |
|------|------|---------------------|---------------------------|-------------------------|----------------|-----|
| A | K0 | 6.84 | 31.9 | 6.71 | 27.97 | 23.6 |
| B | K1-115 | 11.71 | 40.8 | 11.09 | 46.24 | 20.4 |

TABLE 5-continued

Summary of the different processed FFSB, the PCI and the determined AME and AMEn as well as the AME to GE and the AMEn to GE ratios.

| Diet | Code | AME FFSB [MJ/kg DM] | N retention [% of intake] | $AME_n$ FFSB [MJ/kg DM] | $AME_n$/GE [%] | PCI |
|---|---|---|---|---|---|---|
| C | K1-125 | 14.74 | 49.6 | 13.61 | 56.78 | 16.7 |
| D | K2-115 | 13.23 | 48.3 | 12.21 | 50.91 | 18.5 |
| E | K2-125 | 13.79 | 52.3 | 12.46 | 51.97 | 16.8 |
| F | K3-115 | 13.26 | 48.2 | 12.20 | 50.91 | 17.1 |
| G | K3-125 | 14.10 | 50.4 | 12.95 | 54.03 | 15.7 |
| H | Z1 | 14.84 | 51.1 | 13.54 | 56.49 | 12.3 |
| I | Z2 | 14.73 | 50.2 | 13.58 | 56.64 | 11.9 |
| J | Z3 | 14.54 | 49.1 | 13.46 | 56.17 | 10.8 |
| K | Z4 | 14.43 | 50.0 | 13.27 | 55.36 | 10.1 |
| L | Z5 | 14.05 | 47.0 | 13.02 | 54.30 | 8.7 |
| M | Z6 | 13.83 | 45.2 | 12.99 | 54.19 | 7.2 |
| N | Z7 | 13.45 | 39.5 | 12.94 | 63.96 | 6.5 |
| O | Z8 | 13.20 | 40.4 | 12.59 | 52.53 | 5.4 |
| P | Z9 | 12.19 | 38.1 | 11.69 | 48.76 | 4.5 |
| Probabilities, P< | | 0.0001 | 0.0001 | 0.0001 | | |
| LSD,P<0.05 | | 1.00 | 2.75 | 0.912 | | |

FIG. 1 shows the graph of $AME_n$ for poultry of the processed full-fat soybeans (drawn line) as a function of the processing conditions indicator, both obtained by the method according to the present invention. The graph can be expressed by the equation $AME_n = -0.0439 \times PCI^2 + 1.0139 \times PCI + 7.9463$. The figure also shows the $AME_n$ for poultry of the processed full-fat soybeans (diamonds) obtained by the feeding trails as a function of the PCI. The graph obtained by the method of the present invention gives a good fit through the individual points of the feeding trails. The equation or graph obtained by the method according to the present invention gives a coefficient of determination of $R^2 = 0.9252$. In statistics, the coefficient of determination is a number that indicates how well data fit a statistical model, here presented as graph of the function $AME_n = -0.0439 \times PCI^2 + 1.0139 \times PCI + 7.9463$. An $R^2$ of 1 indicates that the regression line fits well the data, while an $R^2$ of 0 indicates that the line does not fit the data at all. In the present case, the equation or graph obtained by the method according to the present invention first the data very well.

The same also applies to the graph or equation, which gives the ratio of $AME_n$ for poultry to GE of processed full-fat soybeans as a function of the processing conditions indicator (shown in FIG. 2). In this figure the diamonds correspond to the individual values of the $AME_n$ as a function of the PCIs for the respective processed full-fat soybeans, and the drawn line represents the graph ($AME_n$/GE = $-0.183 \times PCI^2 + 4.2295 \times PCI + 33.148$) with $R^2 = 0.9252$. Here, again, the equation or graph obtained by the method according to the present invention fits the data very well.

FIG. 5 illustrates the determination of the relative energy amount of an FFSB sample. A PCI of 8 for the sample of processed FFSB gives an $AME_n$ of ca. 95.9%, relative to the maximum value for FFSB. This means that said sample has an energy deficit of ca. 4.1%.

The determination of an energy deficite in an FFSB sample is shown in FIG. 6. In this figure the corrected $AME_n$ is shown as a function of the processing conditions indicator (drawn) with the maximum of the $AME_n$ indicator as a triangle on top of the graph. A PCI of 8 for a sample of processed FFSB gives an $AME_n$ of −0.41 MJ/kg DM. This means that the $AME_n$ of said sample, which may be 10.89 MJ/kg DM calculated on the basis of a typical formula, has to be corrected by a value of −0.41 MJ/kg DM and thus the corrected $AME_n$ of said sample would be 10.48 MJ/kg DM.

The invention claimed is:

1. A computer-implemented method for determining processing influences on an energy value of a sample of a feedstuff raw material and/or feedstuff, the computer-implemented method comprising:
   (a) measuring values of parameters a1) and a2) of a feedstuff or feedstuff raw material at multiple points in time during processing of the sample;
   wherein a1 is selected from the group of parameters consisting of at least one of trypsin inhibitor activity, urease activity, protein solubility in alkali, and protein dispersibility index, and
   wherein a2 comprises the two parameters of an amount of reactive lysine and the total amount of lysine in the sample,
   (b) quantifying the area under the curve of each of measured parameter over said multiple points in time during processing;
   (c1) classifying in a1) as under-processed the sample of the feedstuff raw material and/or feedstuff when trypsin inhibitor activity measured as mg of trypsin per gram of sample is more than 4; when a measured increase in the pH value for determination of urease activity is more than 0.35; when the protein solubility in alkali expressed as a percentage of protein in the sample that is soluble in an alkaline solution is more than 85%; and when the protein dispersibility index expressed as a percentage of an original nitrogen content of the sample is more than 40% (a1); or
   c2) classifying in a2 as over-processed (a2) the sample of the feedstuff raw material and/or feedstuff when the ratio of lysine to the total amount of lysine is less than 90%, and in a1 when the protein dispersibility index is less than 15%, and the protein solubility in alkali is less than 73%; or
   c3) classifying as adequately processed when in a1 the trypsin inhibitor activity is less than 4, the protein solubility in alkali ranges between 73 and 85%, and the protein dispersibility index ranges between 15 and 40%, and in a2 when the ratio of the reactive amount of lysine to the total amount of lysine is at least 90%; and
   (d) feeding pigs or poultry said adequately processed feedstuff raw material or feedstuff;

adjusting processing conditions to further process an under-processed feedstuff raw material or feedstuff into an adequately processed feedstuff raw material or feedstuff and feeding it to pigs or poultry; or adjusting processing conditions to reduce over-processing of an over-processed feedstuff raw material or feedstuff and then feeding the adjusted adequately processed feedstuff raw material or feedstuff to pigs or poultry; or supplementing an under-processed or over-processed feedstuff to form an adequately processed feedstuff and feeding it to pigs or poultry.

2. The method of claim 1, further comprising (e) generating a processing scale by standardizing the areas obtained in c1) to c3) to equal size, sorting the areas obtained for a1) and a2) from over-processing to under-processing or vice versa and assigning a continuous scaling to the standardized and sorted areas; and further comprising inserting into a power series the value of each parameter over multiple points in processing time to generate a mean of values obtained from each power series, wherein said mean is designated as a processing condition indicator (PCI) based on the measured values of each parameter of the feedstuff raw material or feedstuff to evaluate quality of the feedstuff raw material or feedstuff processing, wherein a value below the PCI indicates over-processing and a value above the PCI value indicates under-processing.

3. The method of claim 1, further comprising (f) measuring a gross energy (GE), a digestible energy (DE), a metabolizable energy (ME), a net energy (NE) for pigs, and/or an apparent metabolizable energy corrected to zero nitrogen retention ($AME_n$) for poultry in a sample of the same feedstuff raw material and/or feedstuff described by (a) prior to feeding the feedstuff raw material and/or feedstuff to a pig or poultry chicken.

* * * * *